United States Patent
Huh et al.

(10) Patent No.: US 10,133,143 B2
(45) Date of Patent: Nov. 20, 2018

(54) LENS PANEL AND DISPLAY DEVICE INCLUDING THE SAME

(71) Applicant: Samsung Display Co., Ltd., Yongin-Si, Gyeonggi-Do (KR)

(72) Inventors: Su Jung Huh, Yongin-si (KR); Yi Joon Ahn, Seoul (KR); Jae Joong Kwon, Suwon-si (KR); Keun Kyu Song, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 19 days.

(21) Appl. No.: 15/582,230

(22) Filed: Apr. 28, 2017

(65) Prior Publication Data
US 2018/0088437 A1    Mar. 29, 2018

(30) Foreign Application Priority Data

Sep. 23, 2016 (KR) .................... 10-2016-0122435

(51) Int. Cl.
*G02F 1/29* (2006.01)
*G02B 27/22* (2018.01)
*H04N 13/04* (2006.01)

(52) U.S. Cl.
CPC ............. *G02F 1/29* (2013.01); *G02B 27/225* (2013.01); *H04N 13/0406* (2013.01); *G02B 27/2214* (2013.01); *G02F 2001/294* (2013.01); *H04N 13/0422* (2013.01)

(58) Field of Classification Search
None
See application file for complete search history.

(56) References Cited

U.S. PATENT DOCUMENTS

| | | | |
|---|---|---|---|
| 9,880,343 B2* | 1/2018 | Shim | G02B 6/005 |
| 2003/0048394 A1* | 3/2003 | Okuwaki | G02B 3/14 349/5 |
| 2013/0249896 A1 | 9/2013 | Hamagishi | |

(Continued)

FOREIGN PATENT DOCUMENTS

| CN | 103605245 A | 2/2014 |
|---|---|---|
| EP | 1291705 A2 | 12/2003 |

(Continued)

OTHER PUBLICATIONS

Extended European Search Report corresponding to European Patent Application No. 17181001.3, dated Feb. 2, 2018, 8 pages.

*Primary Examiner* — Ryan Crockett
(74) *Attorney, Agent, or Firm* — Innovation Counsel LLP

(57) ABSTRACT

A lens panel according to an exemplary embodiment includes an area that is divided into a plurality of domains in a plan view. The area includes an optical modulation layer, a first electrode, and a second electrode in a sectional view, the first electrode and the second electrode facing each other interposing the optical modulation layer. The first electrode includes a plurality of first openings, and the second electrode includes a plurality of second openings. One of a first opening among the plurality of first openings and a second opening among the plurality of second openings is disposed in each of the plurality of domains in the plan view. The first opening is disposed in a first domain among the plurality of domains, and the second opening is disposed in a second domain that is adjacent to the first domain among the plurality of domains.

21 Claims, 25 Drawing Sheets

(56) References Cited

U.S. PATENT DOCUMENTS

| | | | |
|---|---|---|---|
| 2015/0084945 A1* | 3/2015 | Kizu | G02B 27/225 345/212 |
| 2015/0138456 A1 | 5/2015 | Liao | |
| 2015/0301341 A1 | 10/2015 | Fang et al. | |
| 2015/0304637 A1 | 10/2015 | Shin et al. | |
| 2016/0000557 A1* | 1/2016 | Galstian | A61F 2/16 623/6.22 |
| 2016/0011429 A1 | 1/2016 | Vdovin et al. | |
| 2016/0291333 A1* | 10/2016 | Chen | G02B 27/22 |
| 2017/0277012 A1* | 9/2017 | Huh | G02F 1/29 |
| 2018/0095340 A1* | 4/2018 | Huh | G02B 27/225 |
| 2018/0120668 A1* | 5/2018 | Huh | G02F 1/29 |
| 2018/0124384 A1* | 5/2018 | Huh | H04N 13/305 |

FOREIGN PATENT DOCUMENTS

| | | |
|---|---|---|
| KR | 10-1350475 | 1/2014 |
| KR | 10-1350971 | 1/2014 |
| KR | 10-2015-0139695 A | 12/2015 |

* cited by examiner

LENS PANEL AND DISPLAY DEVICE INCLUDING THE SAME

CROSS-REFERENCE TO RELATED APPLICATION

This application claims priority to and the benefit of Korean Patent Application No. 10-2016-0122435 filed in the Korean Intellectual Property Office on Sep. 23, 2016, the entire contents of which are incorporated herein by reference.

BACKGROUND

(a) Technical Field

The present disclosure relates to a lens panel and a display device including the same. More specifically, the present disclosure relates to a switchable lens panel and a display device including the same.

(b) Description of the Related Art

With the recent development of display device technology, display devices that can display a three-dimensional (3D) image have drawn attention, and various methods of displaying the 3D image have been researched.

A 3D image display technology expresses a 3D effect of objects by using binocular parallax that is a major factor for perceiving a depth at a short distance. The 3D image display device can be classified in several manners, and broadly, can be classified into a stereoscopic 3D image display device and an autostereoscopic 3D image display device. The stereoscopic 3D image display device causes inconvenience because a user needs to wear spectacles, and thus the autostereoscopic 3D image display device has been more intensively studied and developed.

The autostereoscopic 3D image display device can be classified into a multi-viewing point type, a super multi-viewing point type, an integrated image type, a volumetric image type, a hologram type, or the like. The multi-viewing point type enables a viewer to perceive a 3D image without using spectacles at a specific viewing angle area. The multi-viewing point type can be classified into a spatial division type that realizes a number of required viewing points by spatially dividing the entire resolution using a lens array or the like, and a time division type that displays several viewing point images in time while maintaining the entire resolution. The integrated image type provides a 3D image that is substantially similar to 3D reality by enabling the viewer to recognize a 3D image by storing 3D image information of a basic image photographed with a limited size in slightly different directions and then displaying the stored image through a lens array.

Such an autostereoscopic 3D image display device includes an optical modulation unit for controlling a light path, and a lens array may be typically used as the optical modulation unit. A panel where the lens array can be formed is referred to a lens panel.

The above information disclosed in this Background section is only for enhancement of understanding of the background of the present disclosure, and therefore it may contain information that may not form a prior art that is already known to a person of ordinary skill in the art.

SUMMARY

The present disclosure has been made in an effort to improve a characteristic of a fill factor and/or the like of a lens that is formed by a lens panel.

An exemplary embodiment of the present disclosure has been made in an effort to improve a characteristic of a 3D image displayed using a lens panel by improving a characteristic of a lens formed in the lens panel.

A lens panel according to an exemplary embodiment includes an area that is divided into a plurality of domains in a plan view, wherein the area that is divided into the plurality of domains comprises an optical modulation layer, a first electrode, and a second electrode in a sectional view, the first electrode and the second electrode facing each other interposing the optical modulation layer, the first electrode includes a plurality of first openings, the second electrode includes a plurality of second openings, one of a first opening among the plurality of first openings and a second opening among the plurality of second openings is disposed in each of the plurality of domains in the plan view. The first opening is disposed in a first domain among the plurality of domains, and the second opening is disposed in a second domain that is adjacent to the first domain among the plurality of domains.

A display device according to an exemplary embodiment may include a display panel that includes a plurality of pixels and the lens panel provided in a direction in which the display panel displays an image.

The first opening may be disposed in a third domain that is adjacent to the first domain among the plurality of domains, and a first direction in which the second domain is adjacent to the first domain may be different from a second direction in which the first domain and the third domain are adjacent to each other.

The first opening may be disposed in each of the plurality of domains that are arranged in the second direction to form a first row, the second opening may be disposed in each of the plurality of domains that are arranged in the second direction to form a second row, and the first row and the second row may be alternately arranged in a direction that crosses the second direction.

A width of the first domain in the first direction may be smaller than a width of the first domain in the second direction.

In the plan view, a distance between the first opening and the second opening may be substantially zero.

In the plan view, the lens panel may include a region where the first opening and the second opening overlap with each other.

A width of the region where the first opening and the second opening overlap each other in the first direction may be about 5% or less of a distance between a center of the first opening and a center of the second opening.

The first domain and the second domain may be adjacent to each other sharing a first side.

A shape of the domain may be a polygon, and a shape of the first opening and the second opening may be one of a circle, an oval, and a polygon.

When a voltage difference is applied between the first electrode and the second electrode, a first lens that is formed in the optical modulation layer of the first domain may have a different shape from a second lens that is formed in the optical modulation layer of the second domain.

At least three of the plurality of second openings may be disposed adjacent to the first opening.

The optical modulation layer may include a plurality of liquid crystal molecules.

In the plan view, each of the plurality of domains may overlap two or more pixels.

The plurality of pixels may be arranged in a matrix format, and the plurality of domains may be arranged in a direction that is oblique to a row direction or a column direction where the plurality of pixels are arranged.

The second direction may be oblique to a row direction or a column direction where the plurality of pixels are arranged.

When a voltage difference is applied between the first electrode and the second electrode, a first lens that is formed in the optical modulation layer of the first domain may have a different shape from a second lens that is formed in the optical modulation layer of the second domain, and an image that is displayed by two or more of the pixels corresponding to one of the domains may be refracted to a different direction through the first lens or the second lens formed in the one of the domains.

The display device may further include an adhesive member disposed between the lens panel and the display panel.

According to the exemplary embodiments of the present disclosure, a characteristic of a fill factor of a lens formed in the lens panel can be improved, and accordingly a characteristic of a 3D image displayed using the lens panel can be improved.

DETAILED DESCRIPTION OF THE EMBODIMENTS

Figure 1:
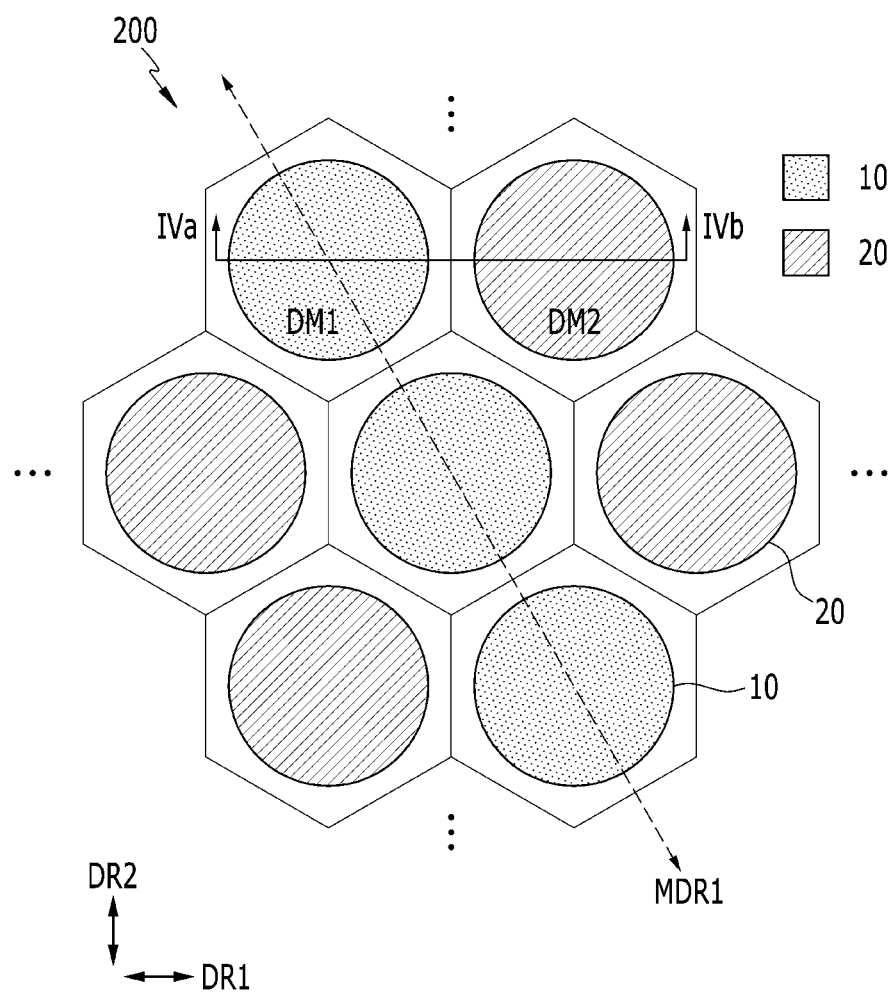
FIG. 1 is a top plan view of a lens panel, according to an exemplary embodiment of the present disclosure.

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification unless explicitly described to the contrary.

In addition, the size and thickness of each configuration shown in the drawings may be arbitrarily shown for better understanding and ease of description, but the present disclosure is not limited thereto. In the drawings, the thickness of layers, films, panels, regions, etc., may be exaggerated for clarity.

It will be understood that when an element such as a layer, film, region, or substrate is referred to as being "on" another element, it can be directly on the other element or one or more intervening elements may also be present. In contrast, when an element is referred to as being "directly on" another element, there may be no intervening elements present. Further, throughout the specification, the word "on" means positioning on or below the object portion, but may not essentially mean positioning on the upper side of the object portion based on a gravitational direction.

In addition, unless explicitly described to the contrary, the word "comprise" and variations such as "comprises" or "comprising" will be understood to imply an inclusion of stated elements but not the exclusion of any other elements.

In the entire specification and drawings, a view and a structure in which a structure on a plane that is parallel with a first direction DR1 and a second direction DR2 that cross each other is observed, is referred to as a plan view (or viewed on a plane) and a plan structure. When a direction that is perpendicular to the first direction DR1 and the second direction DR2 is set to a third direction 3DR, a view and a structure in which a structure on a plane that is parallel with one of the first and second directions DR1 and DR2 and the third direction DR3 is referred to as a sectional view (or viewed on a cross-section) and a cross-sectional structure.

Hereinafter, a lens panel according to an exemplary embodiment of the present disclosure will be described with reference to FIG. 1 to FIG. 10.

First, referring to FIG. 1 to FIG. 5, a lens panel 200 according to an exemplary embodiment includes a first electrode unit 210, a second electrode unit 220, and an optical modulation layer 230. The first electrode unit 210 and the second electrode unit 220 are disposed facing each other in a plan view, and the optical modulation layer 230 is disposed between the first electrode unit 210 and the second electrode unit 220. The lens panel 200 may extend in a plane that is parallel with the first direction DR1 and the second direction DR2, but this is not restrictive. The lens panel 200 may be curved with a curvature that is greater than zero. This may be changed depending on a way of using the lens panel 200 in a 3D image display device or a type of the 3D image display device.

In a plan view, a part or the entire area of the lens panel 200 may be partitioned into a plurality of domains DM. The shape of a single domain DM may be one of various polygons, particularly, a convex polygon having interior angles smaller than 180 degrees. For example, the shape of a domain DM may be a hexagon as shown in the drawing, but this is not restrictive. In other examples, the shape of a domain DM may be a quadrangle, a pentagon, or the like. When a domain DM has n angles (n is a natural number of greater than 3), the domain DM may be adjacent to n domains DM, and two adjacent domains DM may share one side.

The domain DM may be a regular polygon and thus lengths of each side of the domain DM may be equal to one another as shown in the drawing, but this is not restrictive. The sides of the domain may be different from each other. That is, a length of a domain DM in one direction on a plane may be longer than a length in another direction.

A size and a shape of each of the plurality of domains DM included in the lens panel 200 may be consistent, but this is not restrictive. The size and the shape of each of the plurality of domains DM may be different from each other. Further, the domain DM may have an atypical shape rather than a polygon shape. In this case, the plurality of domains DM included in the lens panel 200 may be changed in shape and size depending on its location.

The first electrode unit 210 and the second electrode unit 220 may be respectively formed in the shape of a plate or a film that has a main plane extending on a plane that is parallel with the first direction DR1 and the second direction DR2, but this is not restrictive. The first and second electrode units 210 and 220 may be formed in the shape of a curved plate or film.

Figure 4:
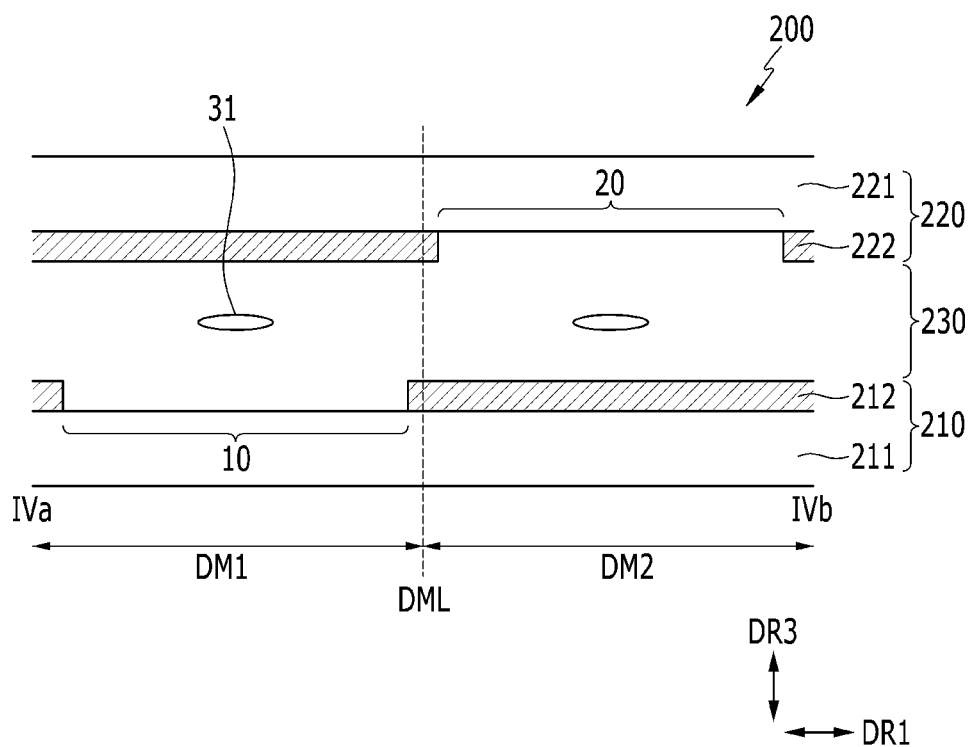
FIG. 4 and FIG. 5 are cross-sectional views of the lens panel of FIG. 1, taken along the line IVa-IVb, in different modes.
Figure 5:
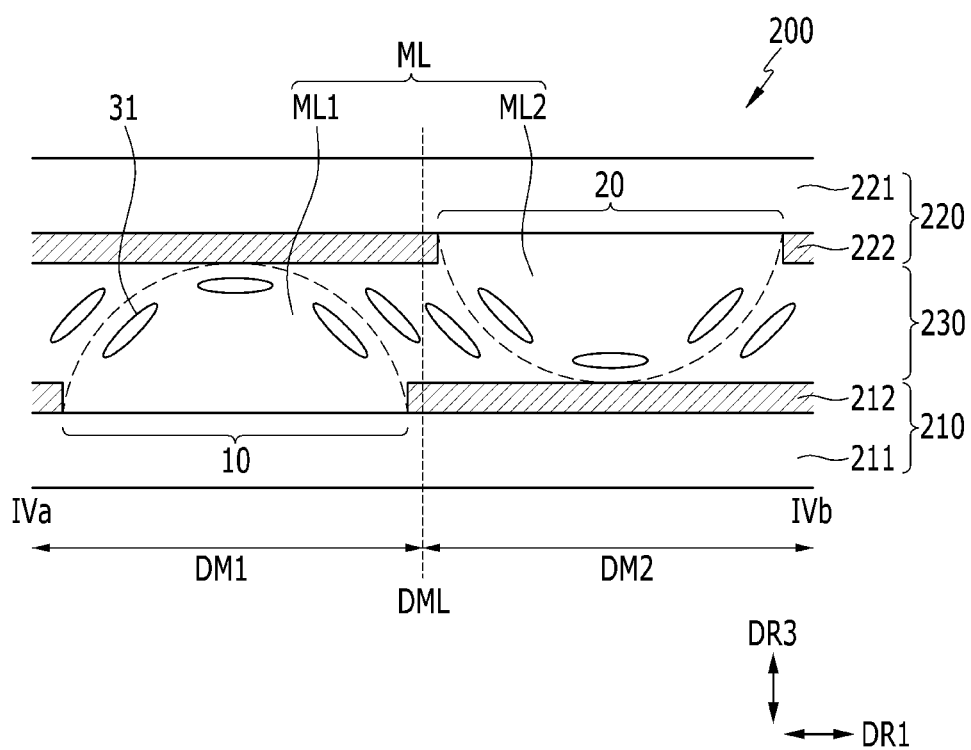

Referring to FIG. 4 and FIG. 5, the first electrode unit 210 includes a first substrate 211 and at least one first electrode 212, and the second electrode unit 220 includes a second substrate 221 and at least one second electrode 222. The first electrode 212 and the second electrode 222 may face each other, interposing the optical modulation layer 230 therebetween. In the present exemplary embodiment, the first electrode unit 210 and the second electrode unit 220 will be described with a structure in which the first electrode unit 210 includes a single first electrode 212 and the second electrode unit 220 includes a single second electrode 222.

The first electrode 212 has a plurality of first openings 10, and the second electrode 222 has a plurality of second openings 20. Herein, an opening is an area where an electrode is removed in a plan view.

Each of the first openings 10 and the second openings 20 may have one of various figures. For example, as shown in FIG. 1, the first openings 10 and the second opening 20 may be respectively formed in the shape of a circle, but this is not restrictive. The first openings 10 and the second openings 20 may be formed in the shape of an oval, a polygon, or the like. In particular, when the shape of the first openings 10 and the second openings 20 is a polygon, the polygon may be a convex polygon having interior angles smaller than 180 degrees.

Widths of each of the first openings 10 and the second openings 20 may be substantially equivalent to each other in every direction, but this is not restrictive. A length in one direction may be longer than a length in another direction. A size and a shape of each of the plurality of first openings 10 included in the first electrode 212 may be consistent, and a shape of each of the plurality of second openings 20 included in the second electrode 222 may be consistent, but this is not restrictive. That is, the first electrode 212 may include a plurality of first openings 10 that are different from each other in shape depending on locations, and the second electrode 222 may include a plurality of second openings 20 that are different from each other in shape depending on locations.

A width of the first and second openings 10 and 20 in one direction may be about 100 micrometers or less, but this is not restrictive. As a resolution of the lens panel 200 is increased, the size of the first and second openings 10 and 20 may be reduced.

One of the first opening 10 and the second opening 20 is disposed in each domain DM. In a plan view, a center of each domain DM may substantially match a center of the corresponding first opening 10 or a center of the corresponding second opening 20. The center of the domain DM may be a mass center of the domain DM, but this is not restrictive, and each domain DM may have various centers such as an intersection point of two or more lines, each being a reference of a symmetrical shape of the domain DM.

According to an exemplary embodiment, the second opening 20 may be disposed in at least one domain DM that is adjacent to a domain DM where the first opening 10 is disposed, and the first opening 10 may be disposed in at least one domain DM that is adjacent to the domain DM where the second opening 20 is disposed. Specifically, referring to FIG. 1 to FIG. 5, the first opening 10 may be provided in one of two domains DM1 and DM2 that are disposed adjacent to each other while sharing one side, and the second opening 20 may be disposed in the other one of the two domains DM1 and DM2.

The first opening 10 may be provided in a domain DM that is adjacent to the domain DM1 while sharing a side other than a side shared by the domain DM2. Similarly, the second opening 20 may be provided in a domain DM that is adjacent to the domain DM2 while sharing a side other than a side shared by the domain DM1.

Figure 2:
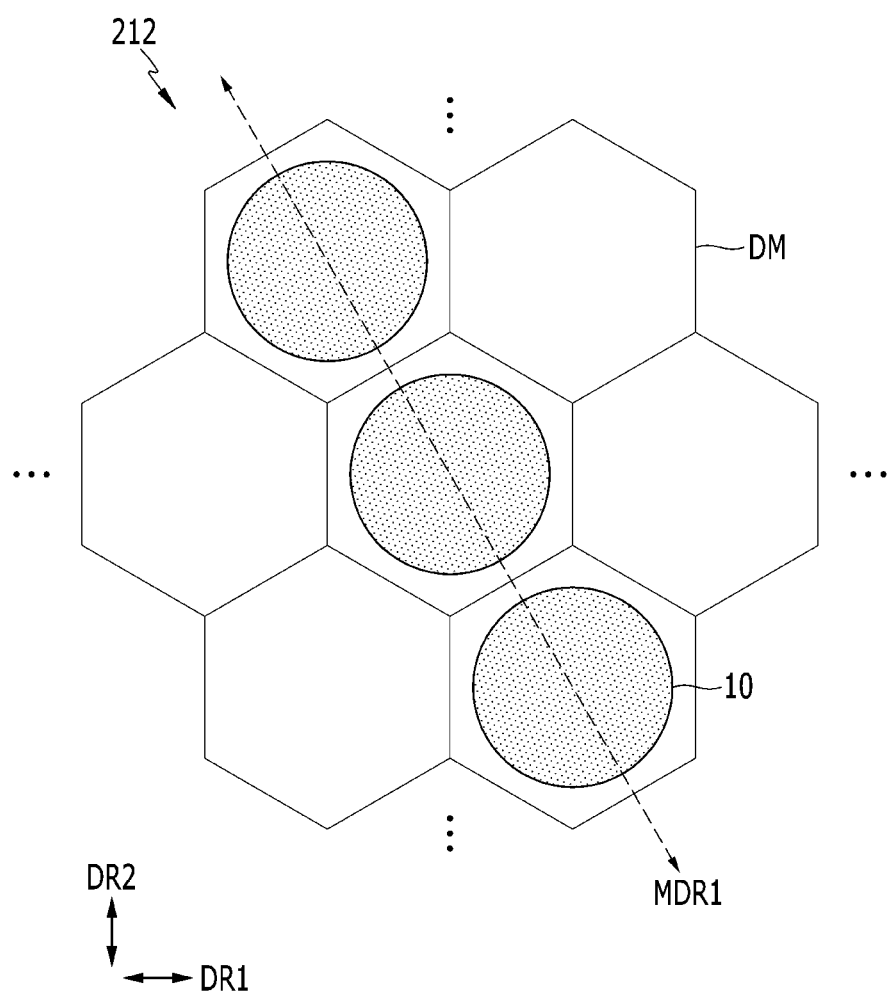
FIG. 2 is a top plan view of an electrode portion included in the lens panel of FIG. 1.
Figure 3:
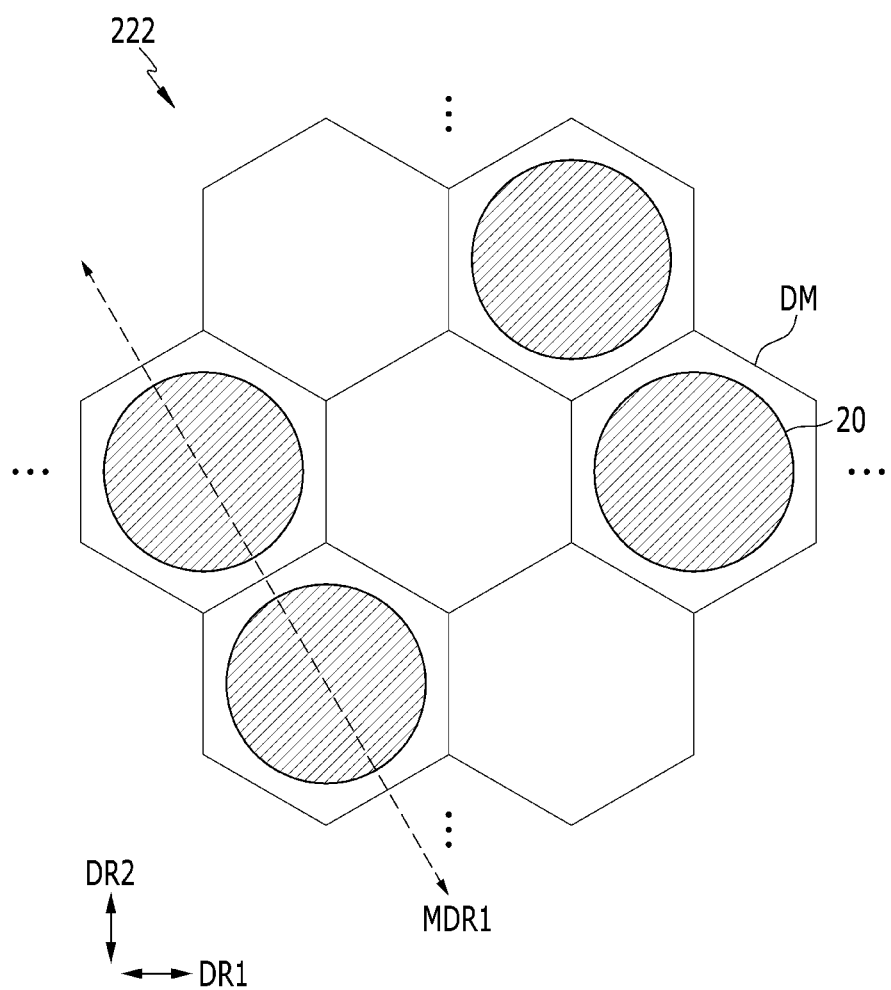
FIG. 3 is a top plan view of another electrode portion included in the lens panel of FIG. 1.

The plurality of first openings 10 that are continuously adjacent to each other may be arranged substantially in parallel with the first domain direction MDR1 as shown in FIG. 1 to FIG. 3. Similarly, the plurality of second openings 20 that are continuously adjacent to each other may be arranged substantially in the first domain direction MDR1 as shown in FIG. 1 to FIG. 3. Here, the domain direction refers to a direction in which continuously adjacent domains DM are arranged, and the first domain direction MDR1 may be one of several directions where the continuously adjacent domains DM are arranged.

A row of the plurality of first openings 10 that are arranged adjacent to each other in the first domain direction MDR1 and a row of the plurality of second openings 20 that are arranged adjacent to each other in the first domain direction MDR1 may be alternately arranged in a direction (e.g., a direction that is perpendicular to the first domain direction MDR1) that crosses the first domain direction MDR1. The first domain direction MDR1 may be oblique to the first direction DR1 and the second direction DR2, but this is not restrictive.

Referring to FIG. 1 to FIG. 5, an area of the first opening 10 and an area of the second opening 20 may be limited to the inside each domain DM. However, a part of the area of the first opening 10 and a part of the area of the second opening 20 may be disposed outside of the corresponding domain DM.

In a plan view, a ratio of the area occupied by the first opening 10 or the second opening 20 in each domain DM with respect to the area of the domain DM may be about 50% or more.

At least one of the first substrate 211 and the second substrate 221 may be attached to a device to which the lens panel 200 is applied. In some embodiments, the first substrate 211 and the second substrate 221 may be omitted depending on a method for forming the device to which the lens panel 200 is applied.

The optical modulation layer 230 is a switchable optical modulation layer, and can control a light path by adjusting a phase of transmitted light. For example, the optical modulation layer 230 may be a liquid crystal layer that includes a plurality of anisotropic liquid crystal molecules 31. The liquid crystal molecule 31 may have positive dielectric anisotropy, but this is not restrictive. A width of the optical modulation layer 230 in the third direction DR3, that is, a gap between the first electrode unit 210 and the second electrode unit 220, may be, for example, about 3 micrometers to about 30 micrometers, but this is not restrictive.

The optical modulation layer 230 has a refractive index distribution that varies depending on a difference of a voltage that is applied between the first electrode 212 and the second electrode 222 such that the optical modulation layer 230 can control the light path. The optical modulation layer 230 may operate in a plurality of modes that include a first mode and a second mode depending on the difference of the voltage that is applied between the first electrode 212 and the second electrode 222.

Referring to FIG. 4, in the first mode, a first voltage difference may be applied between the first electrode 212 and the second electrode 222. The first voltage difference may be, for example, a minimum voltage difference (e.g., 0 V). In the first mode, an alignment direction of liquid crystal molecules 31 in each domain DM, that is, directions of long axes of the liquid crystal molecules 31, may be consistent. For example, in the first mode, the liquid crystal molecules 31 may be arranged in a manner such that the long axes of the liquid crystal molecules 31 are substantially parallel with the main plane of the first electrode unit 210 or the second electrode unit 220, as shown in FIG. 4. However, in the first mode, the long axes of the liquid crystal molecules 31 may be substantially perpendicular to the main plane of the first electrode unit 210 or the second electrode unit 220 in other embodiments. For alignment of the liquid crystal molecules 31, an alignment layer (not shown) may further be provided at at least one of between the first electrode unit 210 and the optical modulation layer 230 and between the second electrode unit 220 and the optical modulation layer 230.

Referring to FIG. 5, when a voltage difference (e.g., about 3.5 V to about 4 V) is applied between the first electrode 212 and the second electrode in the second mode, an electric field that has a component of the third direction DR3 is formed in the optical modulation layer 230 such that the liquid crystal molecules 31 are rearranged. When the liquid crystal molecules 31 have positive dielectric anisotropy, the liquid crystal molecules 31 may be rearranged in a manner such that the long axes of the liquid crystal molecules 31 are arranged in a direction that is substantially parallel with the direction of the electric field.

Specifically, in each domain DM, the liquid crystal molecules 31 are tilted in a specific direction by a fringe field between the first electrode 212 and the second electrode 222 around the edge of the first opening 10 or a fringe field between the second electrode 222 and the first electrode 212 around the edge of the second opening 20. The liquid crystal molecules 31 in each domain DM are tilted in different directions depending on locations in the domain DM. Accordingly, the optical modulation layer 230 forms refractive index distributions that differ from one another depending on a location in a domain DM such that light may undergo a different phase delay depending on the location in the domain DM. Specifically, the liquid crystal molecules 31 that are located at a center of the domain DM may be arranged to be substantially parallel with the main plane of the first electrode unit 210 or the second electrode unit 220, and the liquid crystal molecules 31 that are located around edges of the domain DM may be arranged to be tilted toward the center of the domain DM. A tilting angle of the liquid crystal molecule 31 may be gradually increased toward the edge of the domain DM with reference to the main plane of the first electrode unit 210 or the second electrode unit 220.

Thus, an arrangement format of the liquid crystal molecules 31 in each domain DM is roughly similar to that of a convex lens, and the optical modulation layer 230 of each domain DM forms a lens ML that controls a light path. Unlike a lenticular lens, each lens ML may be a microlens that can refract light to viewing angles in every direction, and the lens panel 200 forms a lens array including a plurality of lenses ML.

In a plan view, the lens ML may be formed in an area that corresponds to the openings 10 and 20, and an area that is outside the openings 10 and 20 may be mostly excluded from a valid area of the lens ML.

The lenses ML formed by the optical modulation lens 230 in the second mode may be divided into first lenses ML1 and second lenses ML2 depending on whether the openings 10 and 20 are located in the first electrode 212 or located in the second electrode 222. The liquid crystal molecules 31 in the first lens ML1 are arranged to be convex toward the second electrode unit 220, and the liquid crystal molecules 31 in the second lens ML2 are arranged to be convex toward the first electrode unit 210. In a single plan view, the shape of the first lens ML1 and the shape of the second lens ML2 are viewed differently and thus the lens ML1 and the lens ML2 are referred to as a first lens ML1 and a second lens ML2, each having a different shape. When the first lens ML1 is inverted in a third direction DR3, the shape of the inverted first lens ML1 may be similar to the shape of the second lens ML2.

Referring to FIG. 5, when the first opening 10 and the second opening 20 are respectively disposed in two adjacent domains DM1 and DM2, the first lens ML1 and the second lens ML2 are respectively formed in the two domains DM1 and DM2 such that the first lens ML1 and the second lens ML2 may be formed adjacent to each other, interposing a domain boundary DML that is a boundary between the two adjacent domains DM1 and DM2. Since the first lens ML1 and the second ML2 that are different from each other in shape are formed adjacent to each other, an arrangement direction of the liquid crystal molecules 31 that are disposed at the periphery of the domain boundary DML is substantially consistent such that a disclination line or a disclination area where non-uniform arrangement of the liquid crystal molecules 31 may occur can be prevented. Accordingly, a maximum planar area of the lens ML formed in each domain DM can be assured. In addition, a fill factor that is defined by a ratio of a planar area of the lens ML with respect to a planar area of each domain DM can be increased, thereby enhancing a characteristic of the lens panel 200.

The details of the lens panel 200 will be described with reference to FIG. 6 to FIG. 9.

Figure 6:
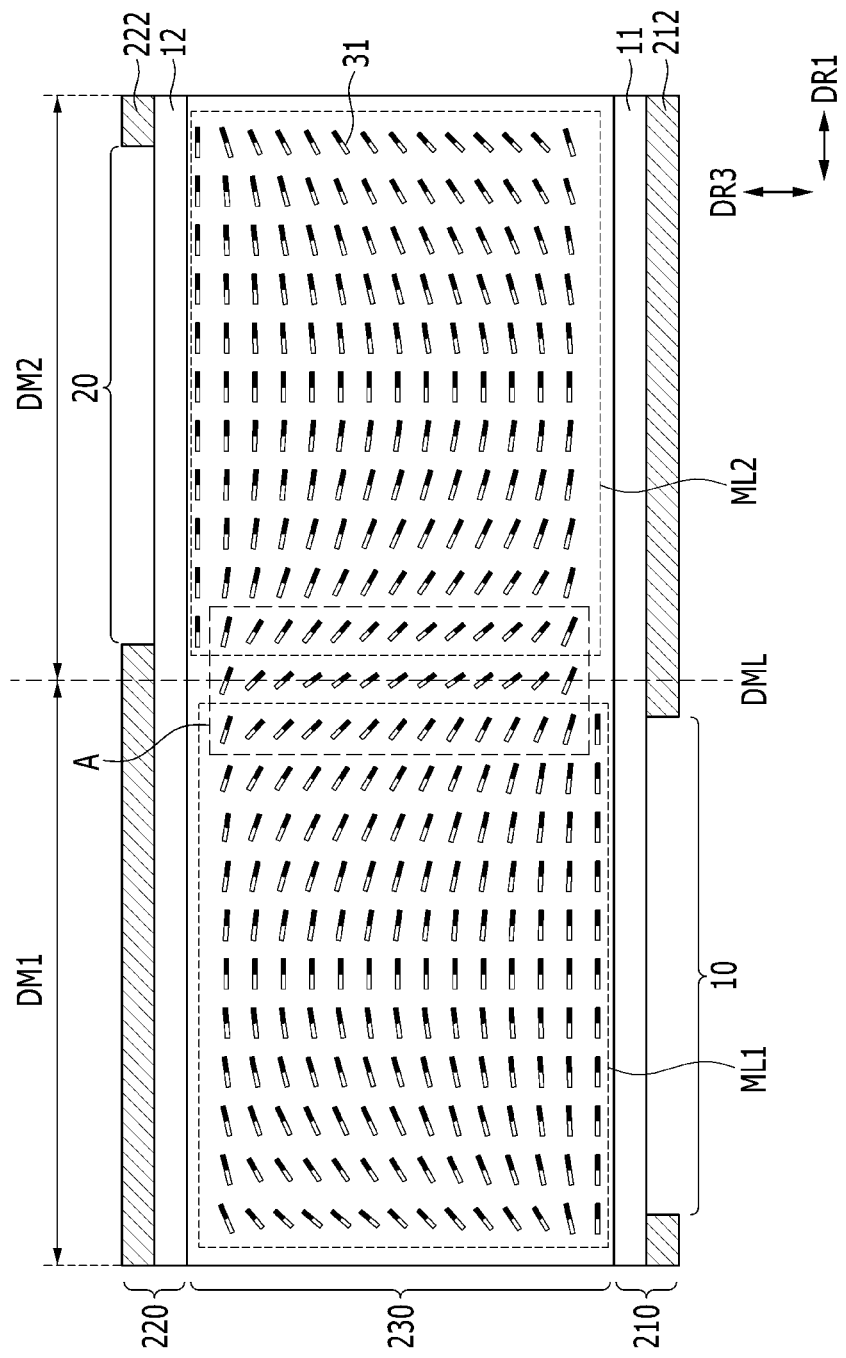
FIG. 6 is a simulation result that shows a liquid crystal alignment when the lens panel according to the exemplary embodiment forms a plurality of lenses.

Referring to FIG. 6, the first electrode unit 210 may further include an alignment layer 11, and the second electrode unit 220 may further include an alignment layer 12. The alignment layers 11 and 12 may define an arrangement direction of the liquid crystal molecules 31. The alignment layers 11 and 12 according to the exemplary embodiment may be horizontal alignment layers, but this is not restrictive. In other embodiments, the alignment layers 11 and 12 may be provided as vertical alignment layers. The alignment layer 11 may be disposed between the first electrode 212 and the optical modulation layer 230, and the alignment layer 12 may be disposed between the second electrode 222 and the optical modulation layer 230.

As previously described with reference to FIG. 5, the first lens ML1 and the second lens ML2 that have different shapes may be formed in two adjacent domains DM1 and DM2 in the optical modulation layer 230. The arrangement direction of the liquid crystal molecules 31 in the domain boundary DML and in a peripheral area A of the domain boundary DML can be substantially constant. Accordingly, the generation of a disclination line or a disclination area where the liquid crystal molecules 31 may be non-uniformly arranged can be prevented at the peripheral area A of the domain boundary DML, and a maximum planar area of the lens ML can be assured, thereby enhancing a fill factor of the lens ML.

Figure 7:
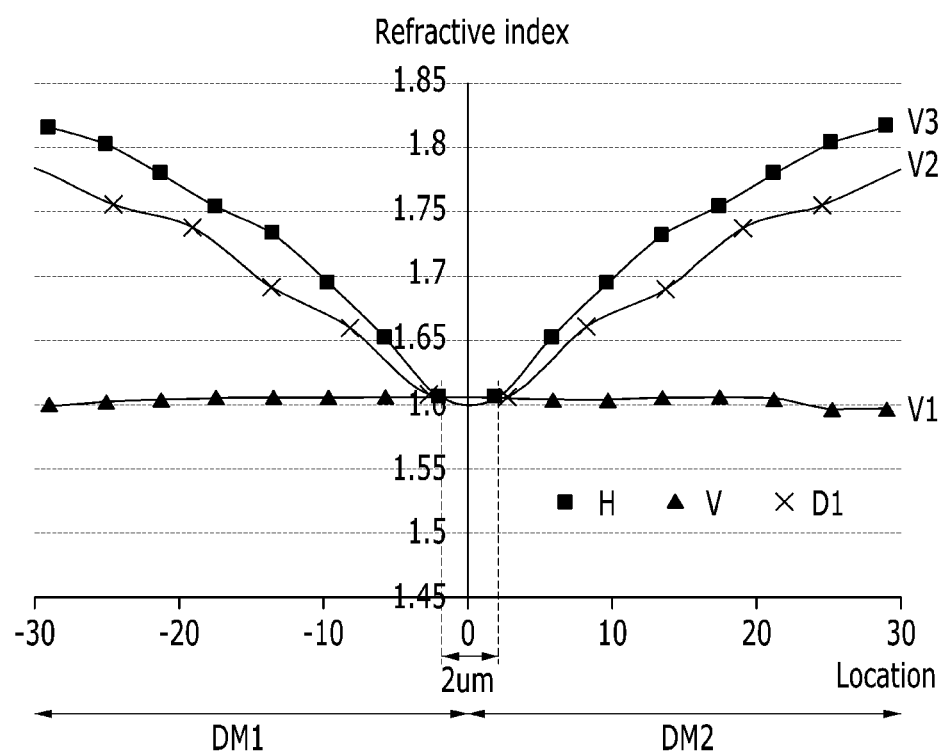
FIG. 7 is a graph illustrating a refractive index of a liquid crystal layer at the periphery of a boundary between two lenses formed by the lens panel shown in FIG. 6.

FIG. 7 is a simulation graph illustrating variation of a refractive index according to a variation of a voltage difference (V1<V2<V3) applied between the first electrode 212 and the second electrode 222 in the two adjacent domains DM1 and DM2 that are shown in FIG. 6. Referring to FIG. 7, it can be observed that a refractive index is mostly uniform at the periphery of the domain boundary DML between the two domains DM1 and DM2, and a width of an area outside of a valid area of the lens ML at the peripheral area A of the domain boundary DML between the two domains DM1 and DM2 is small (e.g., about 2 micrometers).

Figure 8:
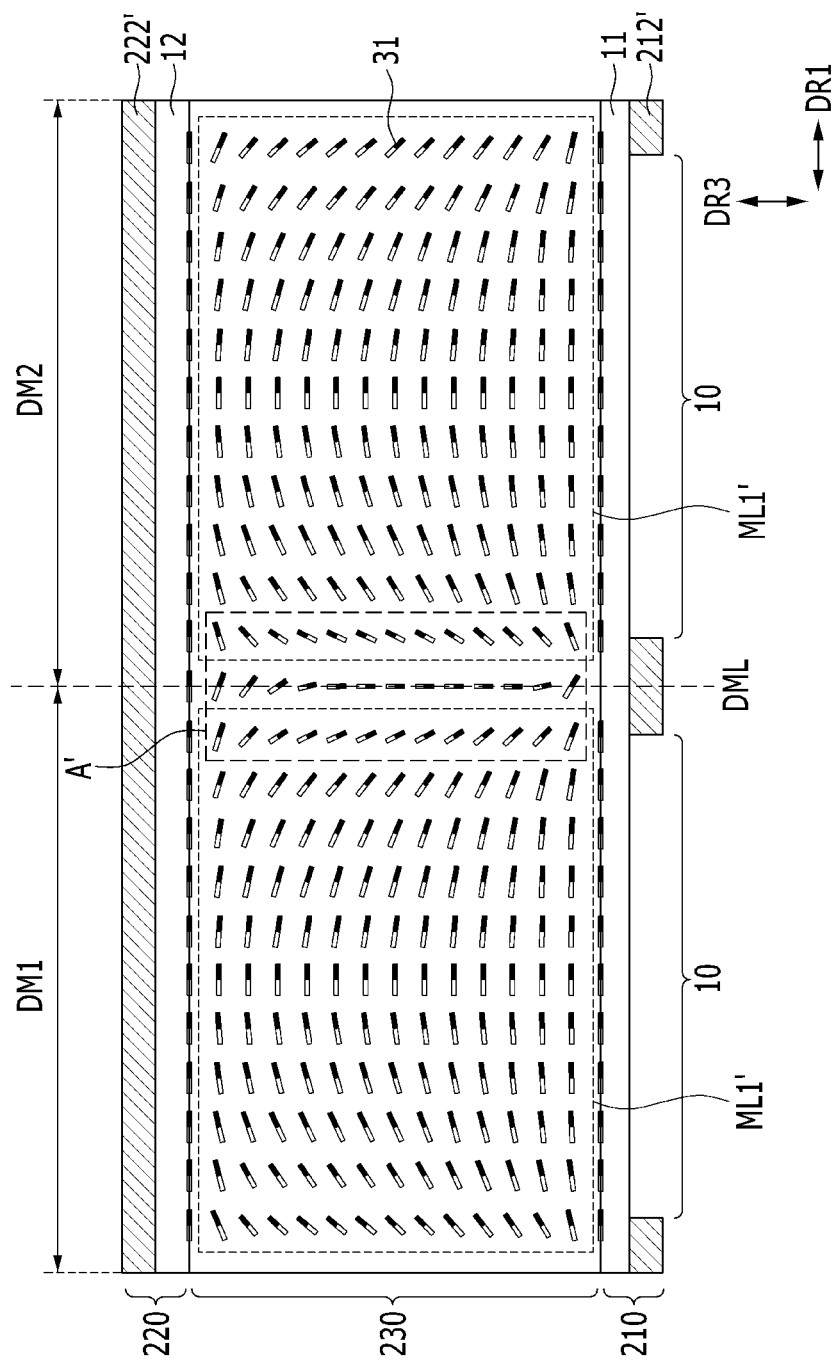
FIG. 8 is a simulation result that shows a liquid crystal alignment when a lens panel according to a comparative example forms a plurality of lenses.
Figure 9:
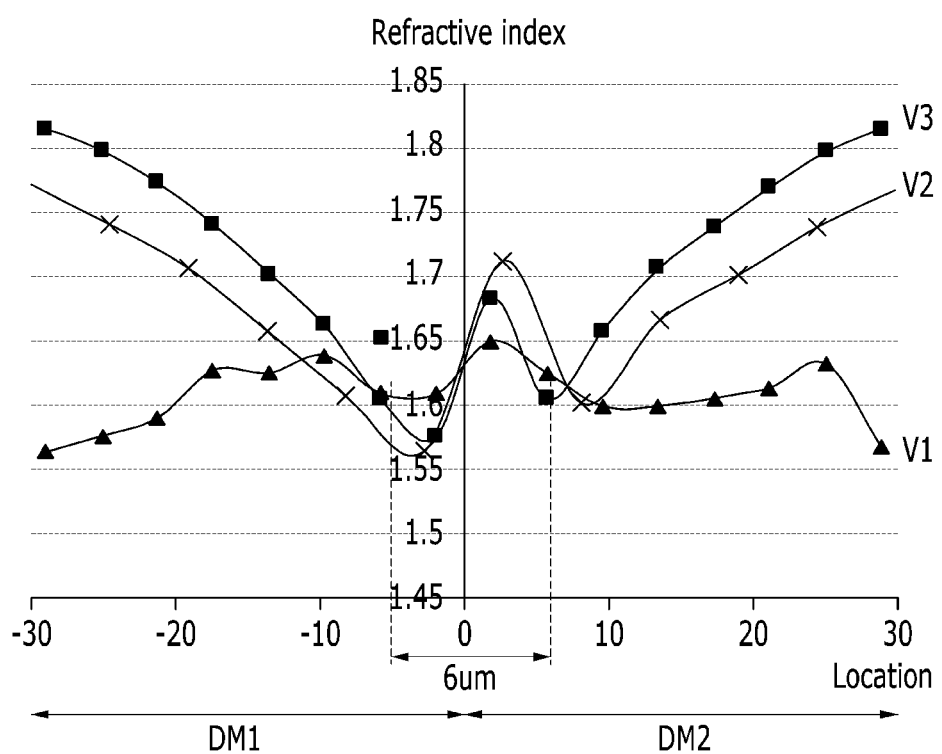
FIG. 9 is a graph illustrating a refractive index of a liquid crystal layer at the periphery of a boundary between two lenses formed by the lens panel shown in FIG. 8.

FIG. 8 and FIG. 9 show a simulation result and a graph illustrating a refractive index according to a comparative example for comparison with the result shown in FIG. 6 and FIG. 7, respectively. Referring to FIG. 8, the present comparative example is substantially similar to the lens panel according to the exemplary embodiment of FIG. 6 in structure, except that a second electrode 222' of a second electrode unit 220 does not include an opening, and a first electrode 212' of a first electrode unit 210 includes two adjacent first openings 10 in two adjacent domains DM1 and DM2. Thus, two first lenses ML1' that are of the same shape are formed in the respective two adjacent domains DM1 and DM2. That is, the first lenses ML1' formed in the optical modulation layers 230 of the two domains DM1 and DM2 may be convex toward the second electrode unit 220. Then, the liquid crystal molecules 31 in a domain boundary DML between the two adjacent domains DM1 and DM2 and in a peripheral area A' of the domain boundary DML are arranged in an inconstant direction. Accordingly, a disclination area where the liquid crystal molecules 31 are non-uniformly arranged is generated at the peripheral area A' of the domain boundary DML, and a valid area of the first lens ML1' formed in each domain DM1 and DM2 is reduced, thereby deteriorating a fill factor of the lens ML1'.

FIG. 9 is a simulation graph illustrating variation of a refractive index of an optical modulation layer according to a variation of a voltage difference (V1<V2<V3) applied between the first electrode 212' and the second electrode 222' in the two adjacent domains DM1 and DM2 shown in FIG. 8. Referring to FIG. 9, it can be observed that a significantly large area where refractive indexes are not uniform at the peripheral area A' of the domain boundary DML between the two domains DM1 and DM2 is formed, and a width of an area outside of the first lenses ML1' at the peripheral area A' of the domain boundary DML between the two domains DM1 and DM2 is significantly large (e.g., about 6 micrometers). That is, when the two adjacent domains DM1 and DM2 both have only the first openings 10 or only the second openings 20, the lenses formed in the two adjacent domains DM1 and DM2 have the same shape such that a disclination area is formed in the domain boundary DML between the two domains DM1 and DM2, and fill factors of the lenses are reduced. Particularly, when only one of the first electrode 212' and the second electrode 222' has an opening, a width of an electrode portion between a plurality of adjacent openings needs to be reduced to increase the fill factors of the lenses. However, there is a minimum width (e.g., about 2.5 micrometers) of an electrode pattern formed between the plurality of adjacent openings due to a limitation in a patterning technology.

Thus, there is a limit in increasing the fill factor of the lens, and a distance (i.e., a pitch of the lens) between the centers of adjacent lenses cannot be reduced such that the lenses ML1' having the same shape and formed in the two adjacent domains DM1 and DM2 as shown in FIG. 8 cannot form high-resolution lenses (e.g., lenses having a pitch of 100 micrometers or less).

However, according to the present exemplary embodiment shown in FIG. 6, a first lens ML1 and a second lens ML2 that have different shapes are formed in two adjacent domains DM1 and DM2 among the plurality of domains DM such that a disclination area is not generated in the domain boundary DML between the two domains DM1 and DM2, and accordingly fill factors of the first and second lenses ML1 and ML2 can be increased. In addition, when the two adjacent domains DM1 and DM2 respectively include the first opening 10 and the second opening 20, the two adjacent openings 10 and 20 are respectively formed in different electrodes 212 and 222 such that there is no limit in a minimum width of an electrode pattern and a minimum distance between the two adjacent openings 10 and 20 may be reduced to zero. Further, in a plan view, portions of areas of the two adjacent openings 10 and 20 may overlap each other. Accordingly, the fill factors of the lenses ML1 and ML2 can be significantly increased, and pitches of the lenses ML1 and ML2 can be reduced, thereby forming high-resolution lenses.

The effect of the lenses ML1 and ML2 will be described in detail with reference to FIG. 10.

Figure 10:
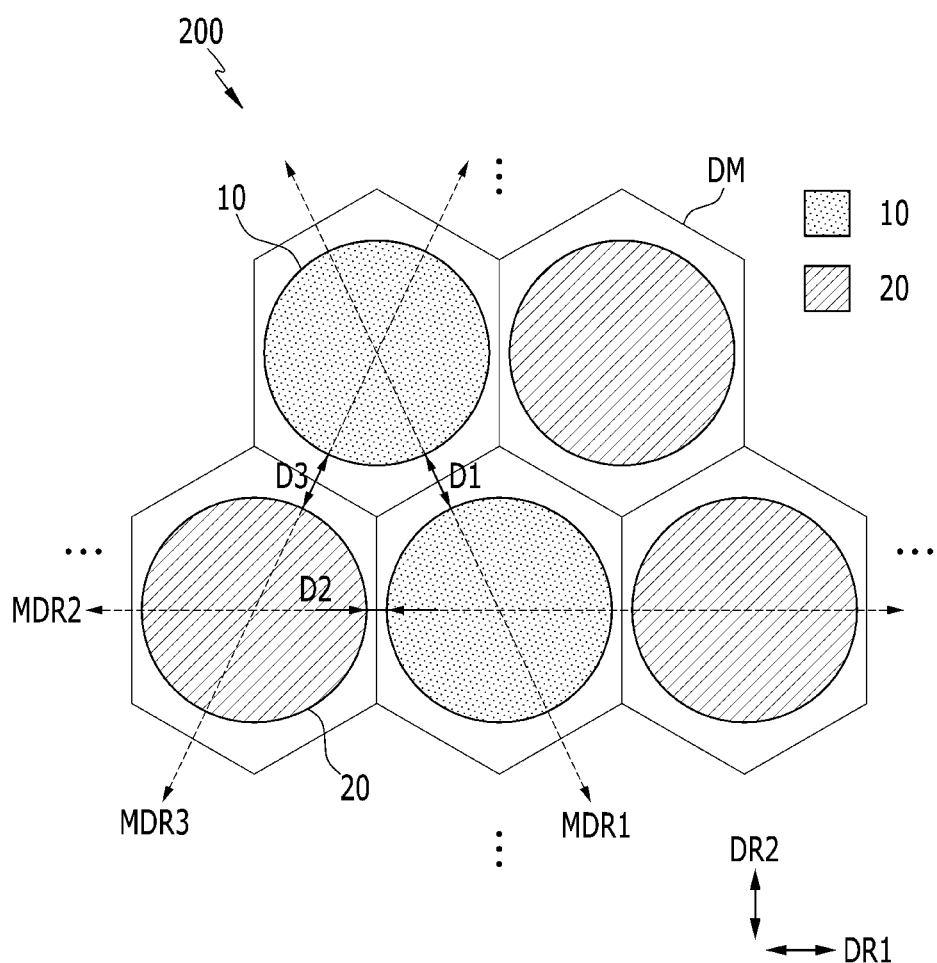
FIG. 10 to FIG. 14 are top plan views of a lens panel, according to an exemplary embodiment.

Referring to FIG. 10, when two domains DM that are adjacent to each other in a first domain direction MDR1 include first openings 10, a distance D1 between adjacent first openings 10 or a distance between adjacent second openings 20 is greater than a predetermined value. The predetermined value is greater than zero since there is a minimum width limitation of an electrode pattern due to a limitation in exposure technology. However, when two domains DM that are adjacent to each other in a second domain direction MDR2 or a third domain direction MDR3 that is different from the first domain direction MDR1 include a first opening 10 and a second opening 20 that are different from each other, a distance D2 and a distance D3 between the adjacent first and second openings 10 and 20 can be made zero without being influenced by the limitation in the minimum width of the electrode pattern. Accordingly, the fill factors of lenses that are formed corresponding to the first opening 10 and the second opening 20 can be enhanced.

A pitch of the domain DM (or a pitch of the openings 10 and 20) in the second domain direction MDR2 and the third domain direction MDR3 may be smaller than a pitch of the domain DM (or a pitch of the openings 10 and 20) in the first domain direction MDR1, but this is not restrictive. When pitches of domains DM that are adjacent to each other (or pitches of openings 10 and 20) in a domain direction are smaller than pitches of domains DM that are adjacent to each other (or pitches of openings 10 and 20) in another domain direction, a distance between the first opening 10 and the second opening 20 is reduced to increase the areas of the openings 10 and 20, thereby enhancing a fill factor of the lens ML.

When a domain DM is formed in the shape of a hexagon that has six sides, a domain direction may include a first domain direction MDR1, a second domain direction MDR2, and a third domain direction MDR3 that are different from each other. Referring to FIG. 10, pitches of openings 10 and 20 in the second domain direction MRD2 and the third domain direction DMR3, and a pitch of the lens formed in the optical modulation layer 230 corresponding to the openings 10 and 20 can be further reduced so that the lens panel 200 having a high resolution can be formed while maintaining a high fill factor.

Although it is not illustrated, the first opening 10 and the second opening 20 formed in two adjacent domain directions may include an overlapped portion in a plan view. In this case, the area where the first opening 10 and the second opening 20 overlap may be less than about 5% with respect to the area of one of the openings 10 and 20, but this is not restrictive.

Next, lens panels according to exemplary embodiments will be described with reference to FIG. 11 to FIG. 18, together with the above-described FIG. 1 to FIG. 10.

Figure 11:
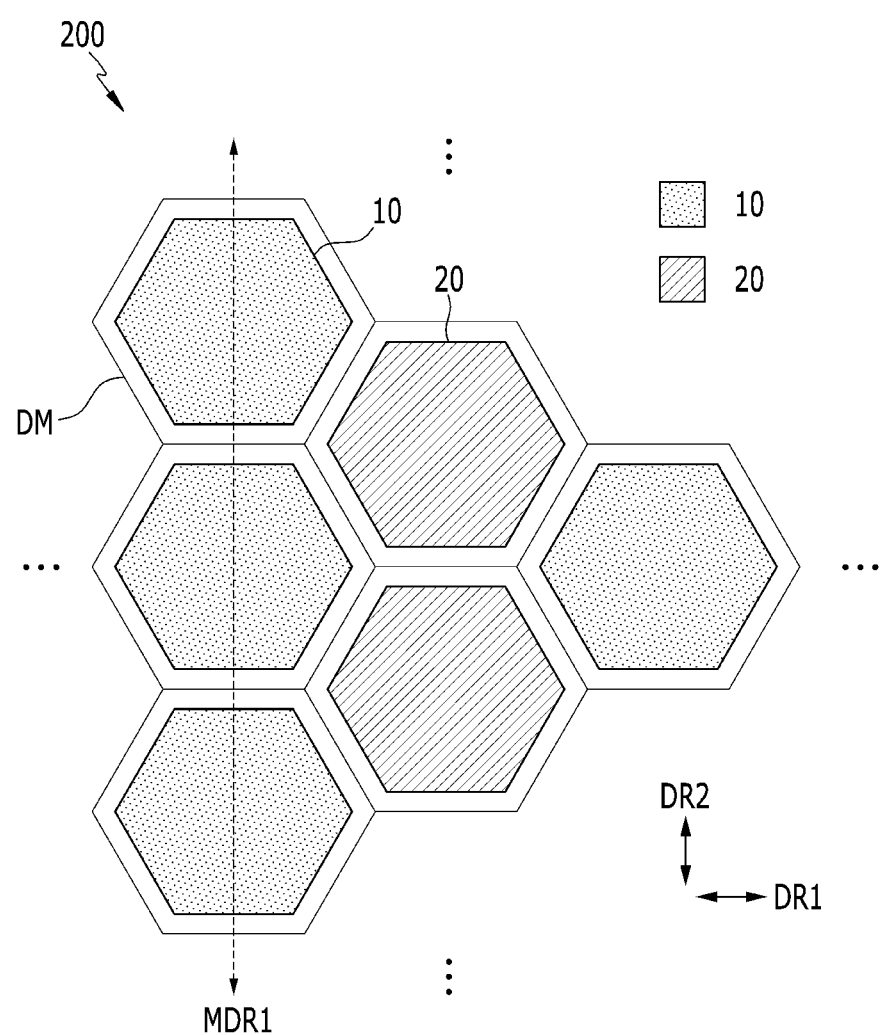

Referring to FIG. 11, a lens panel according to the present exemplary embodiment is substantially similar to the lens panel of the above-described exemplary embodiment shown in FIG. 1, except that shapes of first and second openings 10 and 20 may be the same as the shape of a domain DM. The first opening 10 and the second opening 20 may respectively have sides that are parallel with sides of the domain DM. Specifically, the shape of each of the first and second openings 10 and 20 is exemplarily illustrated as a polygon, and particularly a hexagon. When the shape of the first and second openings 10 and 20 is the same as the shape of the domain DM, a fill factor of a lens can be enhanced.

Figure 12:
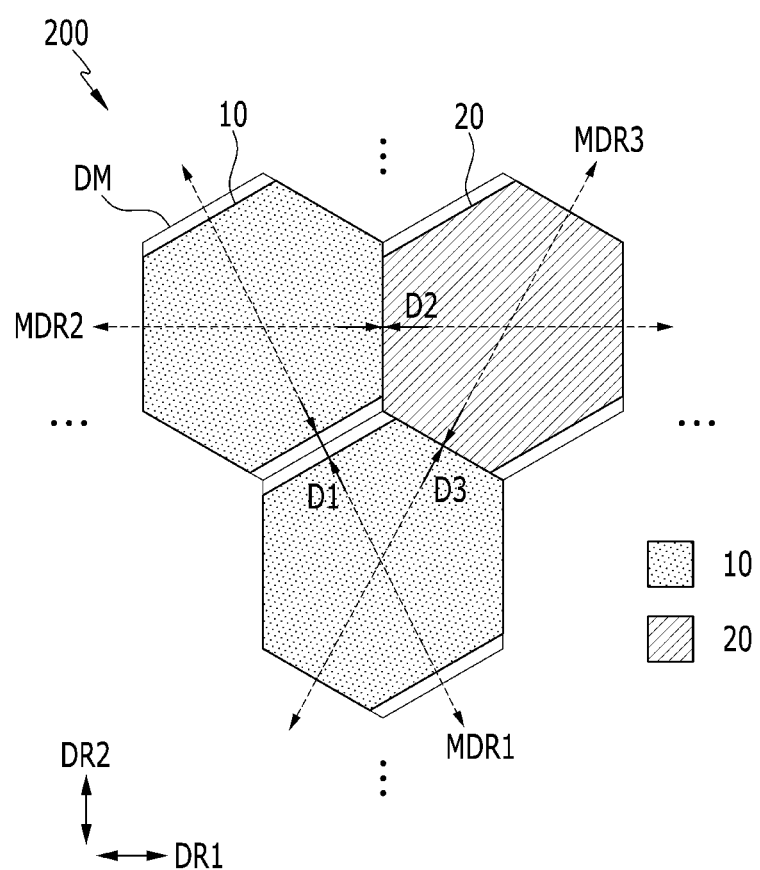

Referring to FIG. 12, the lens panel according to the present exemplary embodiment is substantially similar to the exemplary embodiment shown in FIG. 1, except that the shapes of first and second openings 10 and 20 are exemplarily illustrated as a polygon, and particularly, a hexagon, rather than a circle. In addition, it is exemplarily illustrated in FIG. 12 that when two domains that are adjacent to each other in the second domain direction MDR2 or the third domain direction MDR3 include different first and second openings 10 and 20, respectively, distances D2 and D3 between the two adjacent domains DM are about zero. Accordingly, fill factors of lenses that are formed corresponding to the first opening 10 and the second opening 20 can be improved.

Referring to FIG. 13 to FIG. 16, a lens panel according to the present exemplary embodiment is substantially similar to the above-described exemplary embodiment shown in FIG. 1, except that the shape of each domain DM is a quadrangle rather than a hexagon.

Figure 13:
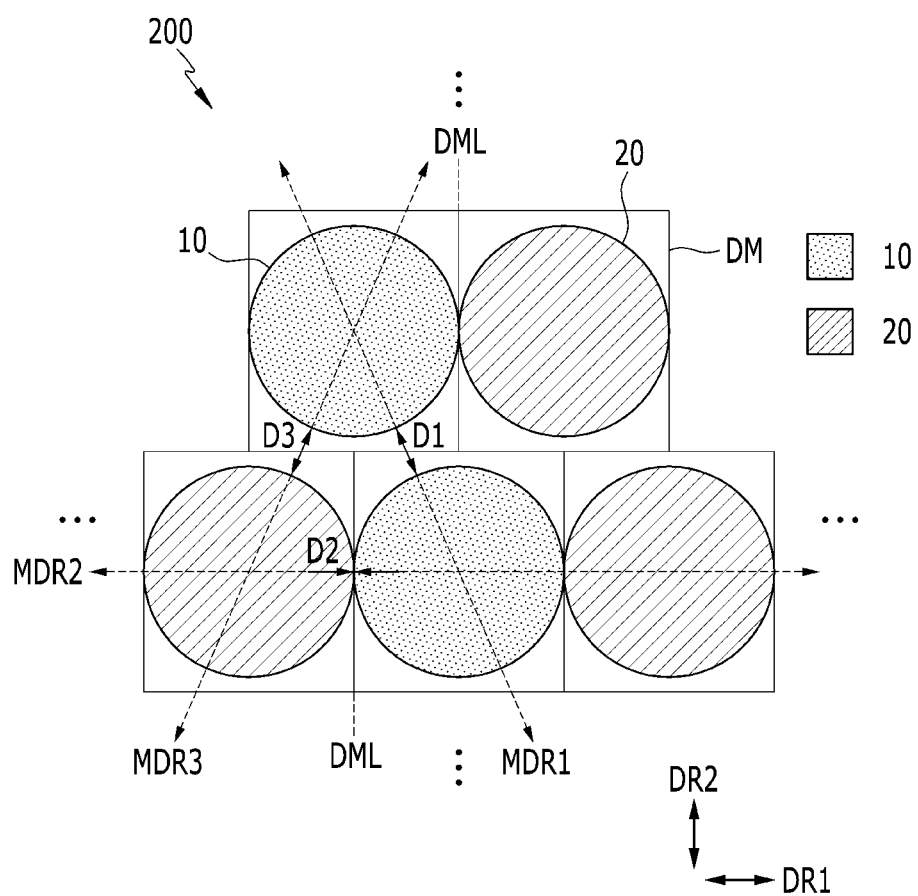
Figure 14:
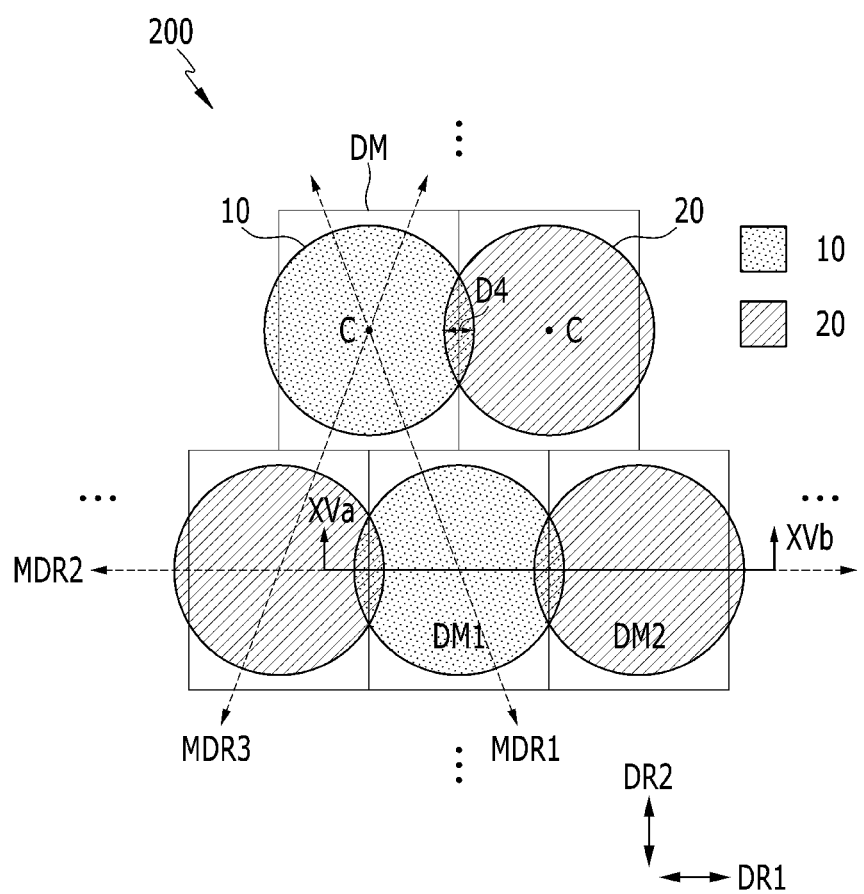
Figure 15:
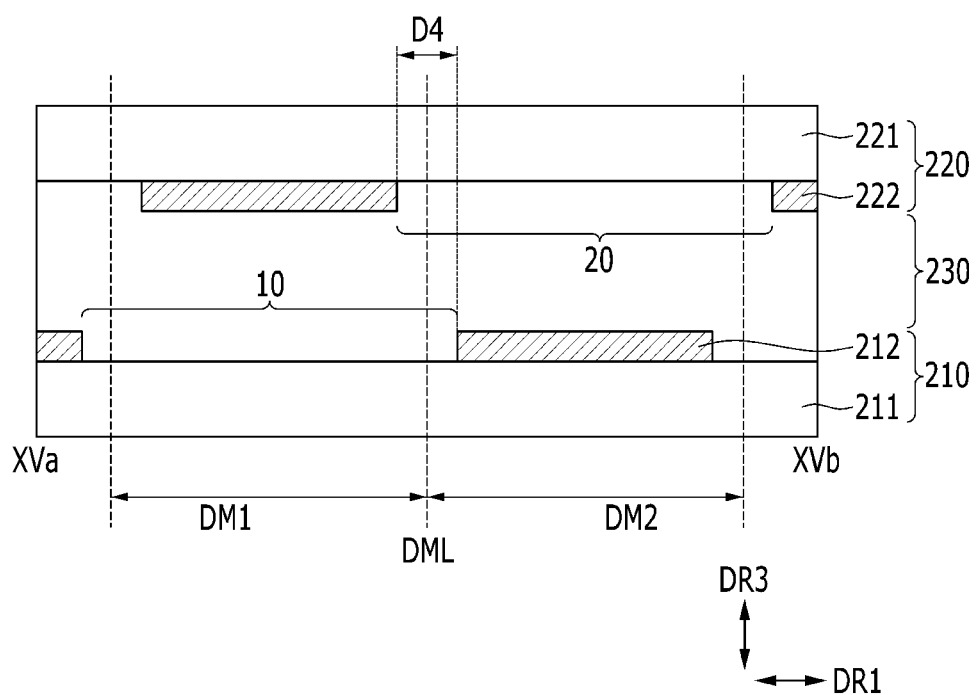
FIG. 15 is a cross-sectional view of the lens panel of FIG. 14, taken along the line XVa-XVb.

Referring to FIG. 13 to FIG. 15, a domain boundary DML between a plurality of domains DM that are arranged in one row in the first direction DR1 may be misaligned with a domain boundary DML between a plurality of domains DM that are arranged in another adjacent row. The first domain direction MDR1, the second domain direction MDR2, and the third domain direction MDR3 may be respectively oblique with respect to the first direction DR1 and the second direction DR2.

Referring to FIG. 13 and FIG. 14, a width of the domain DM in the second direction DR2 may be greater than a width of the domain DM in the first direction DR1. Thus, pitches of the openings 10 and 20 (or pitches of the domains DM) in the second domain direction MDR2 that is parallel with the first direction DR1 may be smaller than pitches of the openings 10 and 20 (or pitches of the domains DM) in the first domain direction MDR1 or the third domain direction MDR3.

In the present exemplary embodiment, the first opening 10 and the second opening 20 are alternately provided in domains DM that are adjacent to each other in the second domain direction MDR2 such that a distance D2 between the first opening 10 and the second opening 20 in the second domain direction MDR2 can be reduced without being influenced by the limitation in an area ratio of the openings 10 and 20 with respect to the domains DM. Thus, the areas of the openings 10 and 20 can be increased, thereby improving fill factors of lenses.

FIG. 13 illustrates an example in which a distance D1 between the first openings 10 that are adjacent to each other in the first domain direction MDR1 or a distance between the second openings 20 that are adjacent in the first domain direction MDR1 and a distance D3 between the first opening 10 and the second opening 20 that are adjacent to each other in the third domain direction MDR3 are greater than zero, and a distance D2 between the first opening 10 and the second opening 20 that are adjacent to each other in the second domain direction MDR2 is zero.

FIG. 14 and FIG. 15 illustrate examples that are substantially similar to the example shown in FIG. 13, except that a first opening 10 and a second opening 20 that are adjacent to each other in the second domain direction MDR2 partially overlap in a plan view. When a virtual line that connects a center C of the first opening 10 and a center C of the second opening 20 that are adjacent to each other is parallel with the first direction DR1, a width D4 of the overlapped portion of the first opening 10 and the second opening 20 in the first direction DR1 may be about 5% or less of a distance (i.e., a pitch of a domain DM in the first direction DR1) between the center C of the first opening 10 and the center C of the second opening 20, but this is not restrictive. The width D4 may be about 5 micrometers or less, but this is not restrictive.

Figure 16:
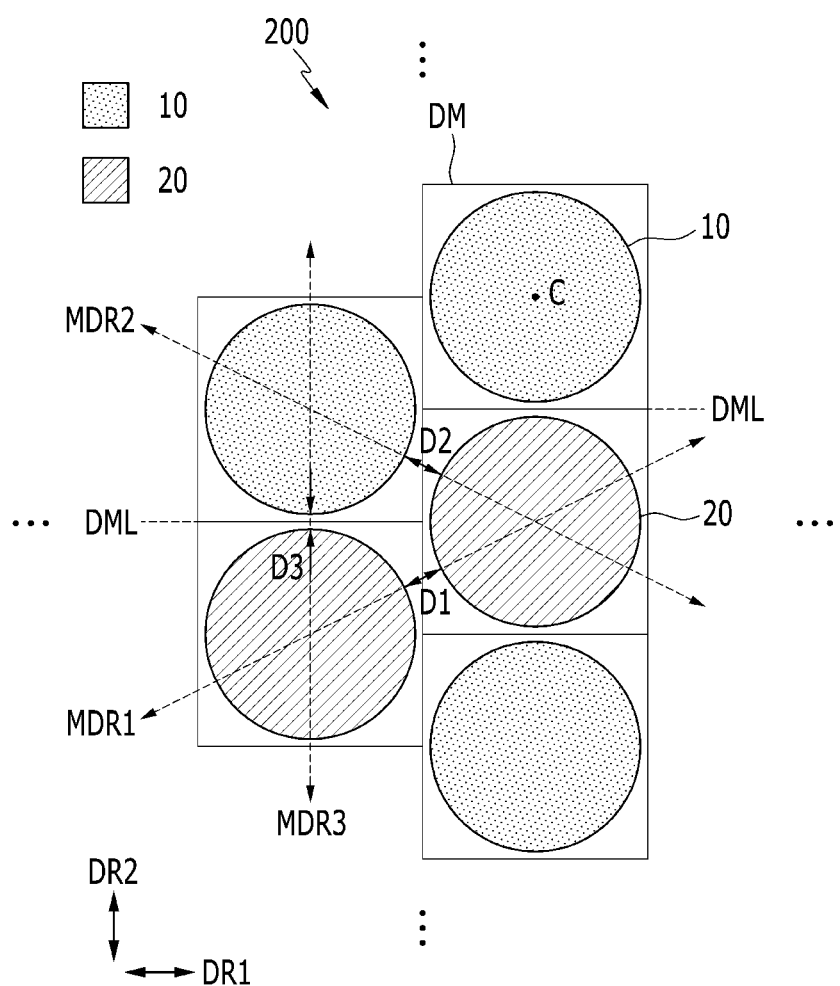
FIG. 16 to FIG. 18 are top plan views of lens panels, according to exemplary embodiments.

Referring to FIG. 16, the present exemplary embodiment is substantially similar to the example shown in FIG. 13, except that a domain boundary DML between a plurality of domains DM arranged in one row along the second direction DR2 mismatches a domain boundary DML between a plurality of domains DM that are arranged in another adjacent row. In addition, a width of the domain DM in the first direction DR1 may be greater than a width of the domain DM in the second direction DR2.

According to the present exemplary embodiment, the first opening 10 and the second opening 20 are alternately disposed in domains DM that are adjacent to each other in the third domain direction MDR3 to reduce a distance D3 between the first opening 10 and the second opening 20 in the third domain direction MDR3 without being influenced by the limitation in an area ratio of the openings 10 and 20 with respect to the domains DM. Accordingly, the areas of the openings 10 and 20 can be increased, and fill factors of lenses can be improved.

FIG. 16 illustrates an example that a distance D1 between first openings 10 that are adjacent to each other in the first domain direction MDR1 or a distance between adjacent second openings 20 and a distance D2 between the first opening 10 and the second opening 20 that are adjacent to each other in the second domain direction MDR2 are greater than zero, and a distance D3 between the first opening 10 and the second opening 20 that are adjacent to each other in the third domain direction MDR3 is greater than zero but smaller than the distances D1 and D2.

Figure 17:
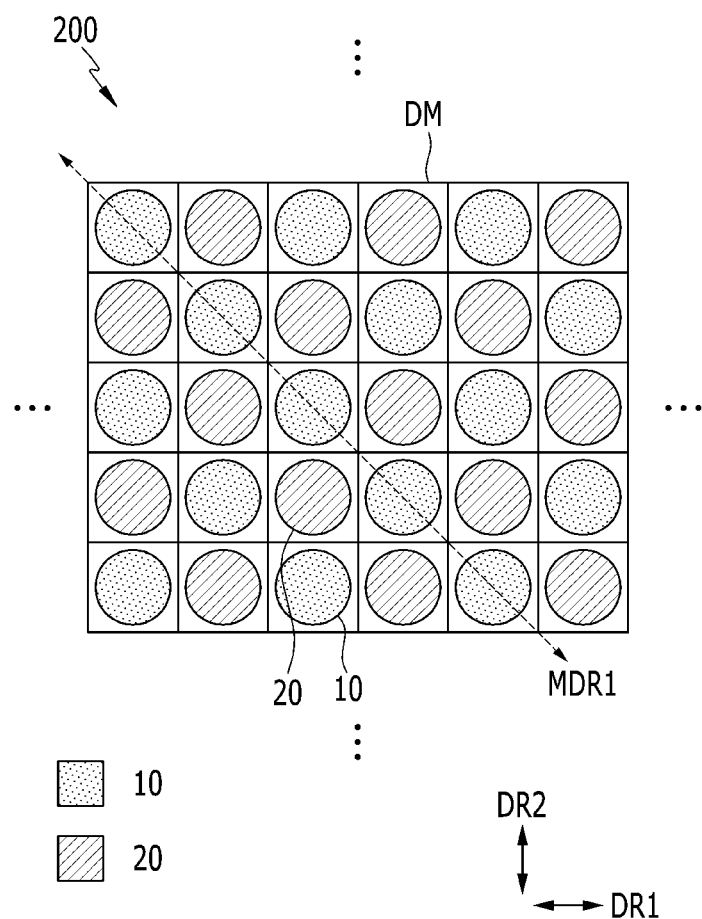

Referring to FIG. 17, a lens panel according to the present exemplary embodiment is substantially similar to the lens panels of the above-described exemplary embodiments, except that each domain DM is formed in the shape of a quadrangle, and domains are arranged in the first direction DR1 and the second direction DR2 in a shape of a checkerboard. First openings 10 and second openings 20 may be alternately arranged with respect to the first direction DR1 and the second direction DR2. In addition, centers of the plurality of first openings 10 that are disposed continuously adjacent to each other and centers of the plurality of second openings 20 that are disposed continuously adjacent to each other may be arranged in a diagonal direction that is oblique to the first and second directions DR1 and DR2. FIG. 17, the first domain direction MDR1 is illustrated as an example of the diagonal direction.

Figure 18:
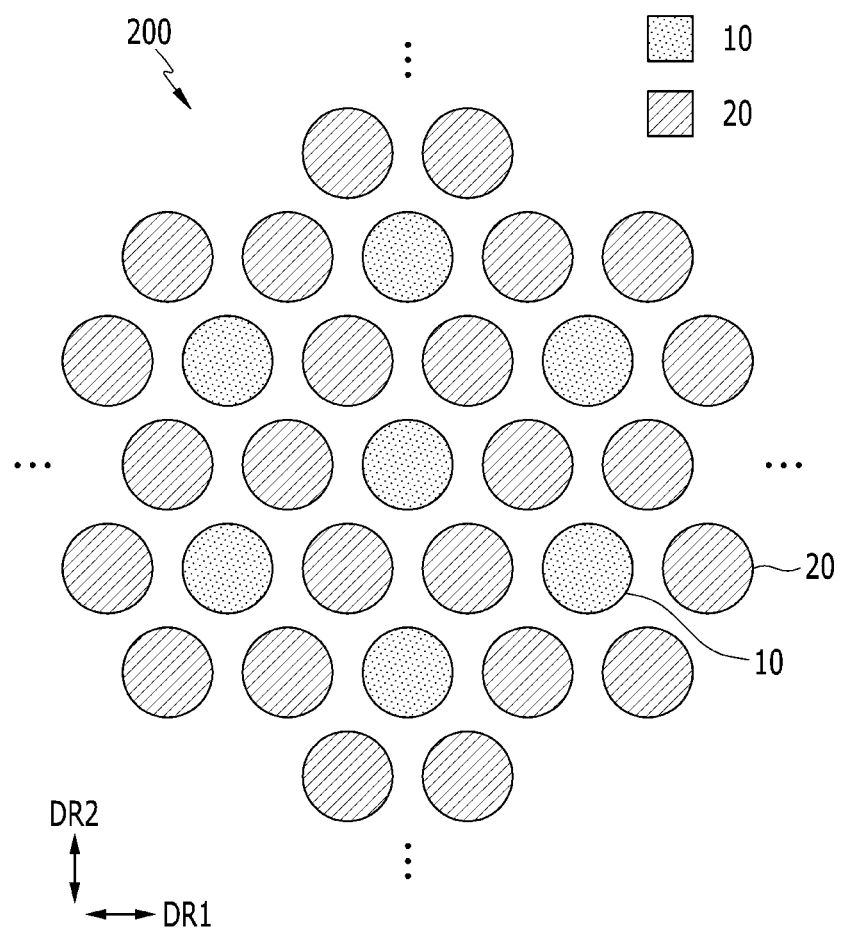

Referring to FIG. 18, a lens panel according to the present exemplary embodiment is substantially similar to the lens panels of the above-described exemplary embodiments, except that at least three openings that are adjacent to one first opening 10 are second openings 20 and at least three openings that are adjacent to one second opening 20 are first openings 10. Particularly, openings that are adjacent to the periphery of one first opening 10 may be second openings 20.

Hereinafter, a display device that includes a lens panel according to an exemplary embodiment will be described with reference to FIG. 19 to FIG. 22, together with the above-described FIG. 1 to FIG. 18.

A display device 1000 according to an exemplary embodiment includes a display panel 100 and a lens panel 200 according to an exemplary embodiment. The lens panel 200 has a structure that is substantially similar to the lens panels according to the above-described exemplary embodiments, and therefore detailed description may be omitted.

The display panel 100 includes a plurality of pixels PX that can display an image and may emit light of an image in a direction toward the lens panel 200. In case of a high-resolution display panel 100, the resolution of the pixel PX may be about 2250 ppi or more, but is not limited thereto.

The display device 1000 may be provided as various displays such as a liquid crystal display (LCD), an organic light emitting diode (OLED) display, or the like. When the display device 1000 is provided as a liquid crystal display (LCD), the display device 1000 may further include a backlight unit (not shown) that supplies light to the display panel 100.

Figure 20:
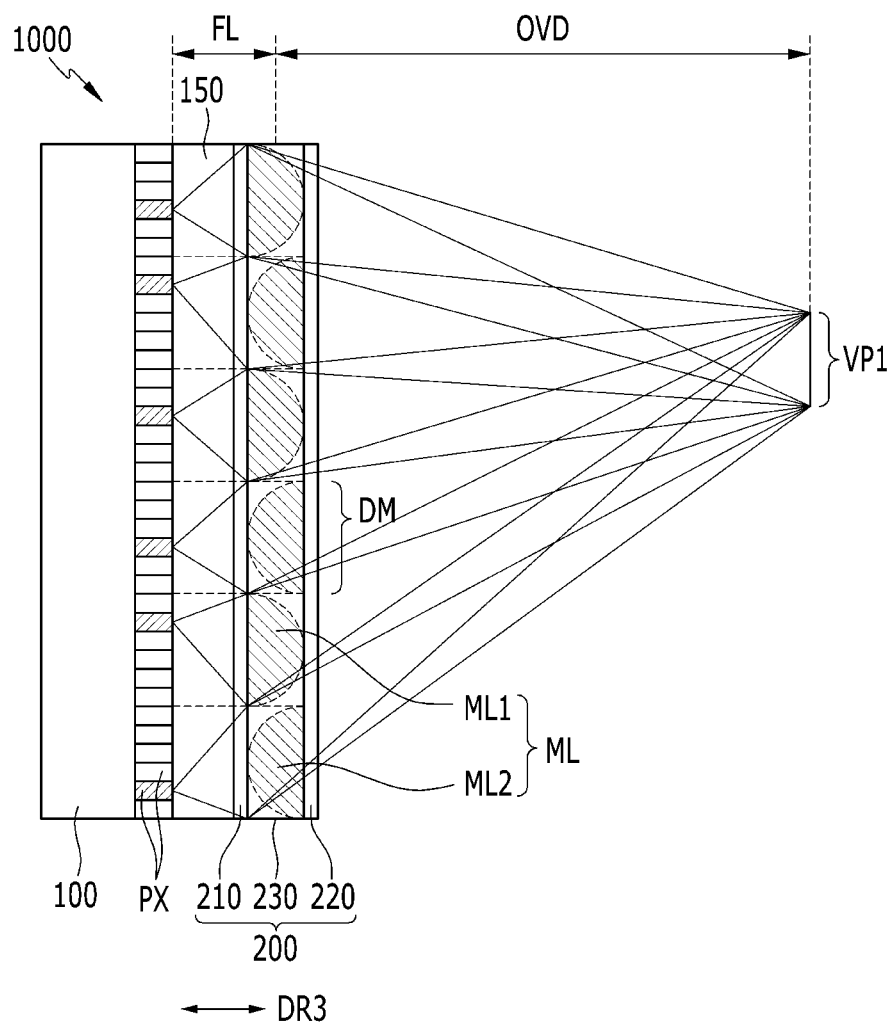
FIG. 20 shows a method for operating a display device that includes a lens panel according to an exemplary embodiment to display an image in one viewing point area in a cross-sectional view.
Figure 21:
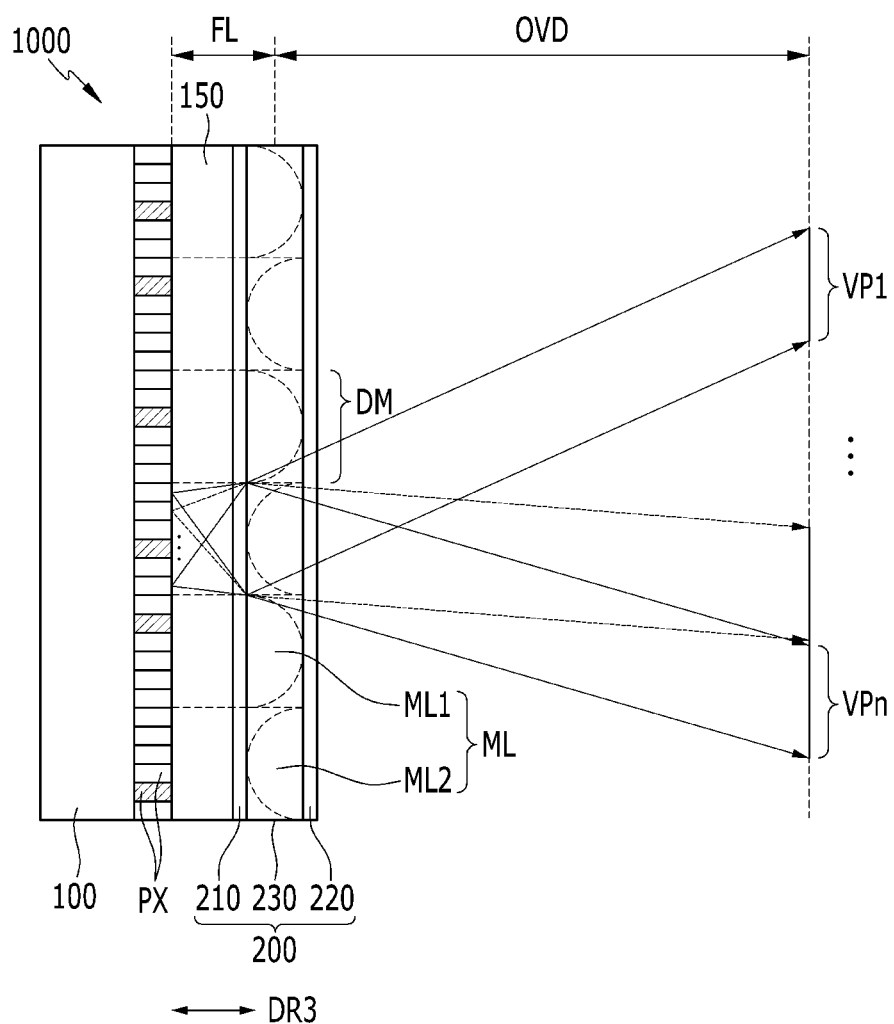
FIG. 21 shows a method for operating a display device that includes a lens panel according to an exemplary embodiment to display an image in several viewing point areas in a cross-sectional view.
Figure 22:
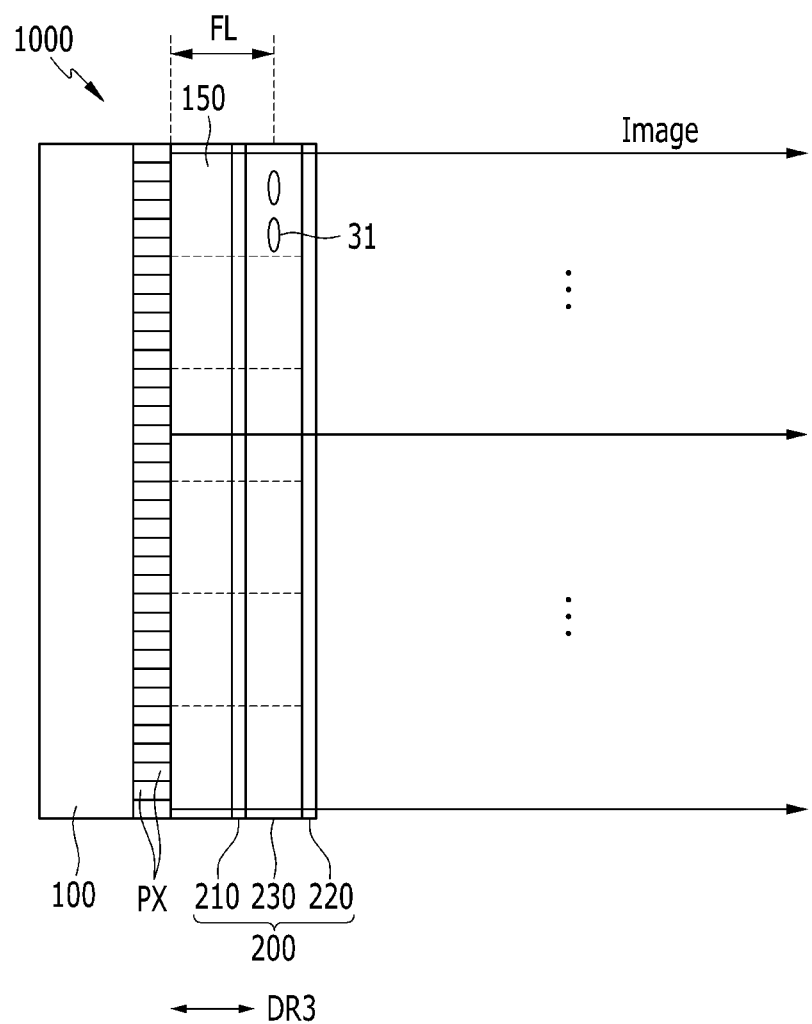
FIG. 22 shows a method for operating a display device that includes a lens panel according to an exemplary embodiment to display a 2D image in a cross-sectional view.

Referring to FIG. 20 to FIG. 22, a transparent adhesive member 150 that fixes the display panel 100 and the lens panel 200 to each other may be provided between the display panel 100 and the lens panel 200. The adhesive member 150 may be, for example, an optically clear resin (OCR) or the like.

Figure 19:
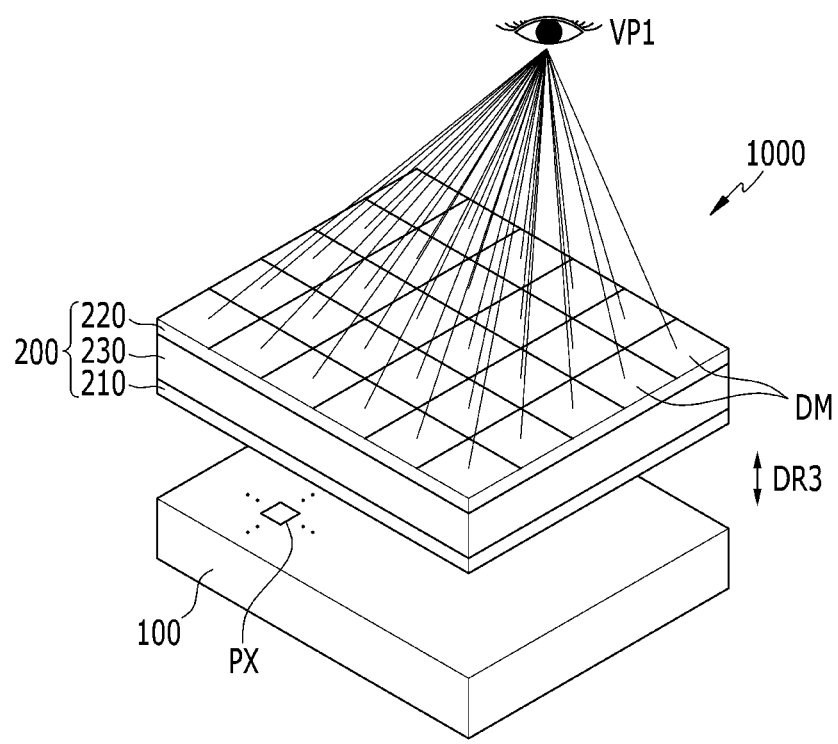
FIG. 19 schematically illustrates a method for operating a display device that includes a lens panel according to an exemplary embodiment to display an image in a viewing point area.

FIG. 19 to FIG. 21 illustrate a method for operating the display device 1000 according to the exemplary embodiment in a 3D mode in which different images are viewed in a plurality of viewing point areas VP1 to VPn. In the 3D mode of the display device 1000, the lens panel 200 operates in the above-described second mode such that a lens array that includes a plurality of lenses ML may be formed in an optical modulation layer 230. As previously described, the plurality of lens ML include a first lens ML1 and a second lens ML2, each having a shape that is inverted with respect to one another. The display device 1000 may be a multi-view display device that can display different images in the plurality of viewing point areas VP1 to VPn in the 3D mode.

Referring to FIG. 20 and FIG. 21, a distance between a display side where an image is displayed in the display panel 100 and a center of a cross-section of a lens ML formed in the lens panel 200 may be a focal distance FL of the lens ML. A distance from the center of the cross-section of the lens ML formed in the lens panel 200 and a point where an optimal stereoscopic image can be viewed is referred to as an optimal viewing distance (OVD).

In the 3D mode, each pixel PX of the display panel 100 displays an image that corresponds to one of the viewing points VP1 to VPn, and an image displayed by each pixel PX may be viewed at a corresponding one among the viewing points VP1 to VPn through the lens panel 200 in the second mode. The left eye and the right eye of a viewer recognize images of different viewing point areas VP1 to VPn such that the viewer can feel a depth or a stereoscopic sense.

Each domain DM of the lens panel 200 may overlap two or more pixels PX of the display panel 100 in a plan view, and light of an image displayed by the pixel PX that is overlapped with each domain DM may pass the corresponding domain DM. Light from a pixel PX that corresponds to each domain DM may be refracted in a different direction depending on a location in the domain DM. That is, the pixels PX that correspond to the respective domains DM may display images that correspond to different viewing point areas VP1 to VPn, and the pixels PX that correspond to the respective domains DM may display images that correspond to the almost entire viewing point areas VP1 to VPn.

Referring to FIG. 19 and FIG. 20, for example, an image of a pixel PX that corresponds to a first viewing point area VP among images of the plurality of pixels PX, incident on the plurality of domains DM, may pass through a lens ML of each domain DM and thus be viewed at the first viewing point area VP1.

Referring to FIG. 21, images of the plurality of pixels that correspond to one domain DM are refracted in different directions while passing through different locations of the lens ML of the respective domains DM, and thus the images can be viewed at the different viewing point areas VP1 to VPn.

According to the present exemplary embodiment, fill factors of lenses formed by the lens panel 200 in the 3D mode can be enhanced, and thus a crosstalk in a 3D image that can be viewed through the display device 1000 can be reduced, thereby improving a characteristic of the 3D image. In addition, as a resolution of the display panel 100 is increased, a resolution of the lens panel 200 needs to be increased. According to the present exemplary embodiment, a lens pitch of the lens panel 200 can be easily reduced without causing deterioration of the fill factor of the lens, thereby facilitating an implementation of a high-resolution 3D display device.

FIG. 22 shows a method for operating the display device 1000 according to the exemplary embodiment in a 2D mode. In the 2D mode, the lens panel 200 operates in the above-described first mode such that no lens ML is formed in the optical modulation layer 230, and accordingly the liquid crystal molecules 31 may be arranged in a constant direction. That is, the lens panel 200 is turned off in the 2D mode such that the image displayed in the display panel 100 is directly passed through the lens panel 200 and thus recognized as a 2D image.

Hereinafter, a disposition relation of a lens panel and a display panel according to an exemplary embodiment will be described with reference to FIG. 23 to FIG. 25, together with the above-described FIG. 19 to FIG. 22.

Figure 23:
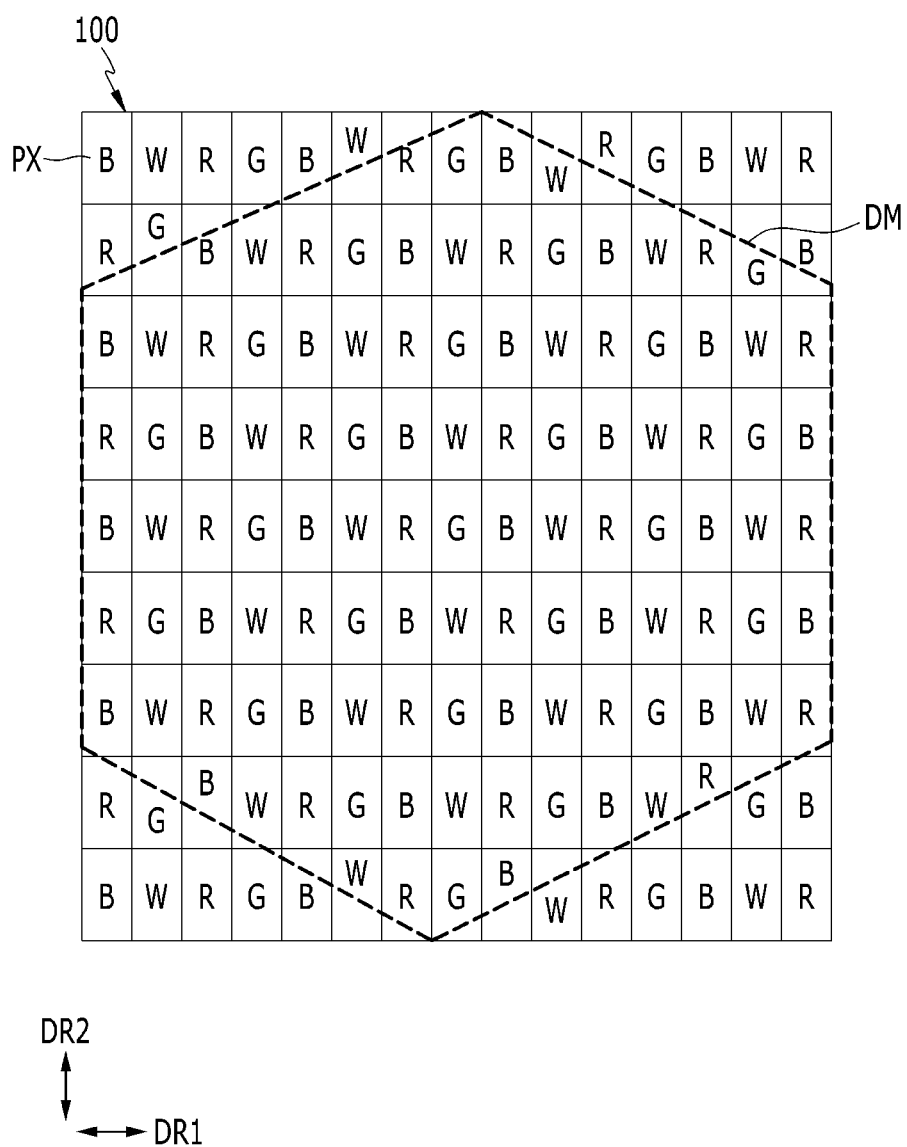
FIG. 23 to FIG. 25 are plan views of display devices that includes lens panels, according to exemplary embodiments.

First, referring to FIG. 23, one domain DM of a lens panel 200 according to the present exemplary embodiment may overlap two or more pixels PX of a display panel 100 in a plan view. For example, the example shown in FIG. 23 illustrates that each domain DM overlaps about 105 pixels PX. Each of the plurality of pixels PX that overlap one domain DM may correspond to a different viewing point area. Thus, in the exemplary embodiment shown in FIG. 23, a displayed image may be divided into about 105 viewing point areas.

The pixels PX of the display panel 100 are arranged substantially in the first direction DR1 and the second direction DR2 that is perpendicular to the first direction DR1 such that they are arranged in a matrix format. Each pixel PX may emit light of one of a plurality of colors. A color that can be displayed by the pixel PX may be one of red R, green G, and blue B, but this is not restrictive.

Figure 24:
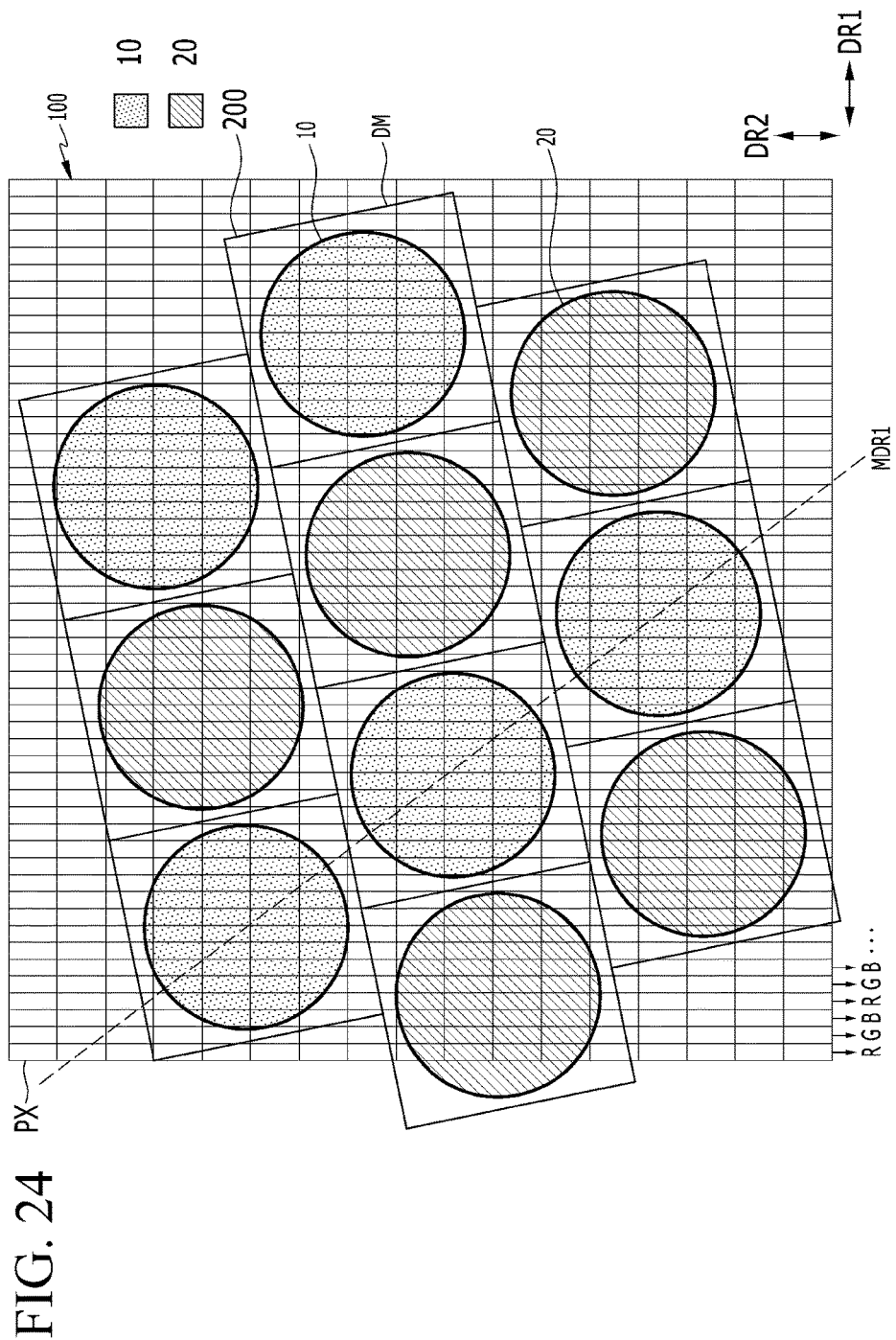

Referring to FIG. 24, when pixels PX of a display panel 100 are arranged in rows and columns that are parallel with the first direction DR1 and the second direction DR2, domains DM of a lens panel 200 may be arranged in a direction that is obliquely slanted with respect to the first direction DR1 and the second direction DR2. In this case, the first domain direction MDR1 may be obliquely slanted with respect to the second direction DR2. Alternatively, the first domain direction MDR1 may be substantially parallel with the second direction DR2.

FIG. 24 illustrates an example in which the alignment structure of the plurality of domains DM of the lens panel 200 is substantially the same as the alignment structure of the exemplary embodiment shown in FIG. 13 or FIG. 14, but the structure of the domains DM of the lens panel 200 is not limited thereto, and may have any structures and shapes of the above-described various exemplary embodiments. For example, the shape of the domain DM may be a hexagon.

The pixels PX of the display panel 100 may display one of red R, green G, and blue B, pixels PX disposed in the same column may display the same color, and columns of pixels PX respectively displaying different colors may be alternately disposed. However, the disposition and alignment of the pixels PX of the display panel 100 are not limited thereto.

In the exemplary embodiment shown in FIG. 24, the number of pixels PX covered by each domain DM is about 13×5, and accordingly, the number of viewing point areas is about 65. However, the number of the viewing point areas is not limited thereto.

Figure 25:
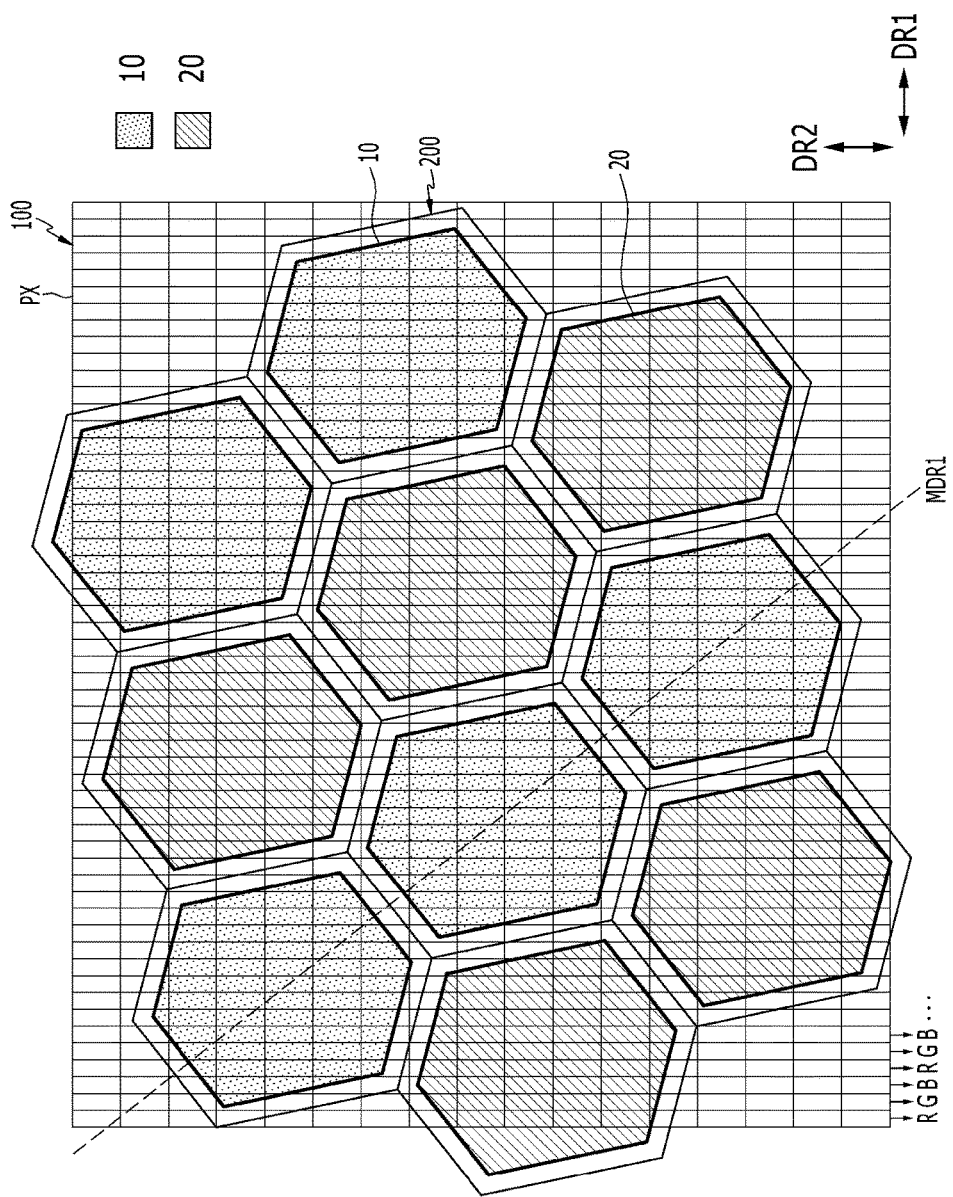

Referring to FIG. 25, the present exemplary embodiment is substantially the same as the exemplary embodiment shown in FIG. 24, but the shape of a domain DM is a hexagon and the shapes of openings 10 and 20 may be substantially the same as the shape of the domain DM. In the exemplary embodiment shown in FIG. 25, the number of pixels PX covered by each domain DM is about 14×5, and accordingly, the number of viewing point areas is about 70. However, the number of the viewing point areas is not limited thereto.

The lens panels according to the exemplary embodiments of the present disclosure may be applied to various uses for controlling of a light path in various 3D display systems in addition to the above-described display device.

While the present disclosure has been described in connection with what is presently considered to be practical example embodiments, it is to be understood that the present disclosure is not limited to the disclosed embodiments, but, on the contrary, is intended to cover various modifications and equivalent arrangements included within the spirit and scope of the present disclosure.

| <Description of symbols> | |
| --- | --- |
| 10, 20: openings | 31: liquid crystal molecule |
| 100: display panel | 200: lens panel |
| 210: first electrode unit | 212: first electrode |
| 220: second electrode unit | 222: second electrode |
| 230: optical modulation layer | 1000: display device |

What is claimed is:

1. A lens panel comprising an area that is divided into a plurality of domains in a plan view, wherein:
   the area that is divided into the plurality of domains comprises an optical modulation layer, a first electrode, and a second electrode in a sectional view, the first electrode and the second electrode facing each other interposing the optical modulation layer,
   the first electrode comprises a plurality of first openings,
   the second electrode comprises a plurality of second openings,
   one of a first opening among the plurality of first openings and a second opening among the plurality of second openings is disposed in each of the plurality of domains in the plan view, and
   the first opening is disposed in a first domain among the plurality of domains, and the second opening is disposed in a second domain that is adjacent to the first domain among the plurality of domains.

2. The lens panel of claim 1, wherein:
   the first opening is disposed in a third domain that is adjacent to the first domain among the plurality of domains; and
   a first direction in which the second domain is adjacent to the first domain is different from a second direction in which the first domain and the third domain are adjacent to each other.

3. The lens panel of claim 2, wherein:
   the first opening is disposed in each of the plurality of domains that are arranged in the second direction to form a first row;
   the second opening is disposed in each of the plurality of domains that are arranged in the second direction to form a second row; and
   the first row and the second row are alternately arranged in a direction that crosses the second direction.

4. The lens panel of claim 2, wherein:
   a width of the first domain in the first direction is smaller than a width of the first domain in the second direction.

5. The lens panel of claim 1, wherein:
   a distance between the first opening and the second opening is substantially zero in the plan view.

6. The lens panel of claim 1, comprising:
   a region where the first opening and the second opening overlap each other in the plan view.

7. The lens panel of claim 6, wherein:
   a width of the region where the first opening and the second opening overlap each other in the first direction is about 5% or less of a distance between a center of the first opening and a center of the second opening.

8. The lens panel of claim 1, wherein:
the first domain and the second domain are adjacent to each other sharing a first side.

9. The lens panel of claim 8, wherein:
a shape of the domain is a polygon; and
a shape of the first opening and the second opening is one of a circle, an oval, and a polygon.

10. The lens panel of claim 1, wherein:
when a voltage difference is applied between the first electrode and the second electrode, a first lens that is formed in the optical modulation layer of the first domain has a different shape from a second lens that is formed in the optical modulation layer of the second domain.

11. The lens panel of claim 1, wherein:
at least three of the plurality of second openings are disposed adjacent to the first opening.

12. The lens panel of claim 1, wherein:
the optical modulation layer comprises a plurality of liquid crystal molecules.

13. A display device comprising:
a display panel that includes a plurality of pixels, and
a lens panel that is disposed in a direction where the display panel displays an image,
wherein:
the lens panel comprises an area that is divided into a plurality of domains in a plan view,
wherein the area that is divided into the plurality of domains comprises an optical modulation layer, a first electrode, and a second electrode in a sectional view, the first electrode and the second electrode facing each other interposing the optical modulation layer,
the first electrode comprises a plurality of first openings,
the second electrode comprises a plurality of second openings,
one of a first opening among the plurality of first openings and a second opening among the plurality of second openings is disposed in each of the plurality of domains in the plan view, and
the first opening is disposed in a first domain among the plurality of domains, and the second opening is disposed in a second domain that is adjacent to the first domain among the plurality of domains.

14. The display device of claim 13, wherein:
each of the plurality of domains overlaps two or more of the plurality of pixels in the plan view.

15. The display device of claim 14, wherein:
the plurality of pixels are arranged in a matrix format; and
the plurality of domains are arranged in a direction that is oblique to a row direction or a column direction where the plurality of pixels are arranged.

16. The display device of claim 14, wherein:
the first opening is disposed in a third domain that is adjacent to the first domain among the plurality of domains; and
a first direction in which the second domain is adjacent to the first domain is different from a second direction in which the first domain and the third domain are adjacent to each other.

17. The display device of claim 16, wherein:
the second direction is oblique to a row direction or a column direction where the plurality of pixels are arranged.

18. The display device of claim 14, wherein:
the first domain and the second domain are adjacent to each other sharing a first side.

19. The display device of claim 18, wherein:
a shape of the domain is a polygon; and
a shape of the first opening and the second opening is one of a circle, an oval, and a polygon.

20. The display device of claim 13, wherein:
when a voltage difference is applied between the first electrode and the second electrode, a first lens that is formed in the optical modulation layer of the first domain has a different shape from a second lens that is formed in the optical modulation layer of the second domain; and
an image that is displayed by two or more of the pixels corresponding to one of the domains is refracted to a different direction through the first lens or the second lens formed in the one of the domains.

21. The display device of claim 13, further comprising an adhesive member disposed between the lens panel and the display panel.

* * * * *